United States Patent
Jang

(10) Patent No.: US 11,469,415 B2
(45) Date of Patent: Oct. 11, 2022

(54) POROUS PARTICULATES OF GRAPHENE SHELL-PROTECTED ALKALI METAL, ELECTRODES, AND ALKALI METAL BATTERY

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 386 days.

(21) Appl. No.: 16/294,360

(22) Filed: Mar. 6, 2019

(65) Prior Publication Data

US 2020/0287206 A1 Sep. 10, 2020

(51) Int. Cl.
| | |
|---|---|
| *H01M 4/36* | (2006.01) |
| *H01M 4/38* | (2006.01) |
| *H01M 4/62* | (2006.01) |
| *H01M 10/0525* | (2010.01) |
| *H01M 10/054* | (2010.01) |
| *H01M 4/02* | (2006.01) |

(52) U.S. Cl.
CPC ............ *H01M 4/366* (2013.01); *H01M 4/38* (2013.01); *H01M 4/628* (2013.01); *H01M 10/054* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | |
|---|---|---|
| 7,071,258 B1 | 7/2006 | Jang et al. |
| 2005/0271574 A1 | 12/2005 | Jang et al. |
| 2008/0048152 A1 | 2/2008 | Jang et al. |
| 2016/0315326 A1* | 10/2016 | Shin ................. H01M 4/663 |
| 2017/0301918 A1* | 10/2017 | Le Roux ............. C01B 35/127 |
| 2017/0352868 A1* | 12/2017 | Zhamu ............... H01M 4/133 |
| 2018/0175433 A1* | 6/2018 | Zhamu ............... H01M 4/661 |

OTHER PUBLICATIONS

Hummers et al., "Preparation of graphitic oxide" J. Am. Chem. Soc. (1958) vol. 80, p. 1339.
Jang et al., "Processing of Nano Graphene Platelets (NGPs) and NGP Nanocomposites: A Review" J. Materials Sci. (2008) vol. 43, pp. 5092-5101.

* cited by examiner

*Primary Examiner* — Anca Eoff

(57) ABSTRACT

Provided is a porous graphene particulate comprising a graphene shell encapsulating a porous core, wherein the porous core comprises one or a plurality of pores and pore walls and a lithium-attracting metal or sodium-attracting metal residing in the pores or deposited on pore walls; wherein the lithium-attracting or sodium-attracting metal is selected from Au, Ag, Mg, Zn, Ti, Li, Na, K, Al, Fe, Mn, Co, Ni, Sn, V, Cr, or an alloy thereof and is in an amount of 0.1% to 90% of the total particulate weight, and the shell comprises multiple single-layer or few-layer graphene sheets. Also provided is a powder mass, anode, or battery that contains one or a plurality of such porous particulates.

26 Claims, 7 Drawing Sheets

POROUS PARTICULATES OF GRAPHENE SHELL-PROTECTED ALKALI METAL, ELECTRODES, AND ALKALI METAL BATTERY

FIELD OF THE INVENTION

The present invention relates generally to the field of alkali metal battery (e.g. any lithium metal battery using lithium metal as an anode active material or sodium metal battery using sodium metal as an anode active material) and, more particularly, to a lithium or sodium metal secondary battery having multiple porous graphene particulates pre-loaded with lithium or sodium metal as an anode active material and a process for producing the particulates, the electrode and the battery.

BACKGROUND OF THE INVENTION

Rechargeable lithium-ion (Li-ion) and lithium metal batteries (e.g. Li-sulfur, Li metal-air, and lithium-metal oxide batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal. Hence, in general, Li metal batteries have a significantly higher energy density than lithium ion batteries. Similarly, Na metal batteries have a higher energy than corresponding sodium ion batteries.

Historically, rechargeable lithium metal batteries were produced using non-lithiated compounds, such as $TiS_2$, $MoS_2$, $MnO_2$, $CoO_2$, and $V_2O_5$, as the cathode active materials, coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's.

To overcome these safety issues, several alternative approaches were proposed in which either the electrolyte or the anode was modified. The first approach involves replacing Li metal by graphite (a Li insertion material) as the anode. The operation of such a battery involves shuttling Li ions between two Li insertion compounds at the anode and the cathode, respectively; hence, the name "Li-ion battery." Presumably because of the presence of Li in its ionic rather than metallic state, Li-ion batteries are inherently safer than Li-metal batteries. The second approach entails replacing the liquid electrolyte by a dry polymer electrolyte, leading to the Li solid polymer electrolyte (Li-SPE) batteries. However, Li—SPE has seen very limited applications since it typically requires an operating temperature of up to 80° C. The third approach involves the use of a solid electrolyte that is presumably resistant to dendrite penetration, but the solid electrolyte normally exhibits excessively low lithium-ion conductivity at room temperature. Alternative to this solid electrolyte approach is the use of a rigid solid protective layer between the anode active material layer and the separator layer to stop dendrite penetration, but this typically ceramic material-based layer also has a low ion conductivity and is difficult and expensive to make and to implement in a lithium metal battery. Furthermore, the implementation of such a rigid and brittle layer is incompatible with the current lithium battery manufacturing process and equipment.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of graphite anode is <372 mAh/g and that of lithium transition-metal oxide or phosphate based cathode active material is typically in the range from 140-200 mAh/g. As a result, the specific energy of commercially available Li-ion cells is typically in the range from 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Among various advanced energy storage devices, alkali metal batteries, including Li-air (or Li—$O_2$), Na-air (or Na—$O_2$), Li—S, and Na—S batteries, are especially attractive due to their high specific energies.

The Li—$O_2$ battery is possibly the highest energy density electrochemical cell that can be configured today. The Li—$O_2$ cell has a theoretic energy density of 5.2 kWh/kg when oxygen mass is accounted for. A well configured Li—$O_2$ battery can achieve an energy density of 3,000 Wh/kg, 15-20 times greater than those of Li-ion batteries. However, current Li—$O_2$ batteries still suffer from poor energy efficiency, poor cycle efficiency, and dendrite formation and penetration issues.

One of the most promising energy storage devices is the lithium—sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium—sulfur cell operates with a redox couple, described by the reaction $S_8 + 16Li \leftrightarrows 8Li_2S$ that lies near 2.2 V with respect to $Li^+/Li°$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weights or volumes. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-350 Wh/kg (based on the total cell weight), which is far below what is possible. In summary, despite its great potential, the practical realization of the Li—S battery has been hindered by several obstacles, such as dendrite-induced internal shorting, low active material utilization efficiency, high internal resistance, self-discharge, and rapid capacity fading on cycling. These technical barriers are due to the poor electrical conductivity of elemental sulfur, the high solubility of lithium polysulfides in organic electrolyte (which migrate to the anode side, resulting in the formation of inactivated Li$_2$S in the anode), and Li dendrite formation and penetration. The most serious problem of Li metal secondary (rechargeable) batteries remains to be the dendrite formation and penetration. Sodium metal batteries have similar dendrite problems.

Carbon is known to have five unique crystalline structures, including diamond, fullerene (0-D nanographitic material), carbon nanotube or carbon nanofiber (1-D nanographitic material), graphene (2-D nanographitic material), and graphite (3-D graphitic material). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nanocarbon or 1-D nanographite material.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nanographene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2016), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152).

Our research group also presented the first review article on various processes for producing NGPs and NGP nanocomposites [Bor Z. Jang and A Zhamu, "Processing of Nanographene Platelets (NGPs) and NGP Nanocomposites: A Review," J. Materials Sci. 43 (2008) 5092-5101]. Four main prior-art approaches have been followed to produce NGPs. The most commonly used process is chemical oxidation and reduction of graphite to produce graphene oxide (GO) and reduced graphene oxide (RGO).

This process, as schematically illustrated in FIG. 1, entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=\frac{1}{2}d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.

(2) The chemical treatment process requires a long intercalation and oxidation time, typically 5 hours to five days.

(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) The thermal exfoliation requires a high temperature (typically 800-1,200° C.) and, hence, is a highly energy-intensive process.

(5) Both heat- and solution-induced exfoliation approaches require a very tedious washing and purification step. For instance, typically 2.5 kg of water is used to wash and recover 1 gram of GIC, producing huge quantities of waste water that need to be properly treated.

(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalant species retained by the flakes decompose to produce various species of sulfuric and nitrous compounds (e.g., $NO_x$ and $SO_x$), which are undesirable. The effluents require expensive remediation procedures in order not to have an adverse environmental impact.

Hence, an urgent need exists to have a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets. Furthermore, one should be able to readily make these graphene sheets into a foam structure.

Our recent research has yielded a process for chemical-free production of isolated nanographene platelets that is novel in that is does not follow the established methods for production of nanographene platelets outlined above. In addition, the process is of enhanced utility in that it is cost effective, and provided novel graphene materials with significantly reduced environmental impact. Furthermore, as herein disclosed, we have combined the chemical-free production of graphene and the formation of porous graphene hybrid particulates into one single operation. These porous particulates also contain a lithium- or sodium-attracting metal inside the pores of these particulates to promote entry of lithium metal or sodium metal during a battery charge procedure.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene particulates can contain pristine or non-pristine graphene and the invented method allows for this flexibility.

It is an object of the present invention to provide a cost-effective process for producing highly conductive, mechanically robust graphene porous particles (individual porous particulates, not part of a graphene foam). The particulate contains a lithium-attracting or sodium-attracting metal residing therein, in the form of minute particles or thin coating in physical contact with the pore wall of the porous graphene/carbon particulate structure. This process does not involve the use of an environmentally unfriendly chemical. This process enables the flexible design and control of the porosity level and pore sizes in such a manner that a lithium-attracting metal or sodium-attracting metal is readily and easily accommodated in these pores to promote and facilitate fast entry and uniform deposition of lithium ions or sodium ions if the resulting graphene/carbon-metal particulates are used as an anode active material of a lithium metal or sodium metal battery.

It is another object of the present invention to provide graphene/carbon hybrid particulates having a graphene/carbon shell encapsulating or embracing a porous core. The porous pore may be composed of one single pore or a plurality of pores. Such graphene/carbon particulates, if containing a select alkali metal-attracting metal, are conducive to being used as a supporting substrate for lithium in the anode of a lithium metal secondary battery to suppress the formation of lithium or sodium dendrites. The encapsulating shell typically comprises multiple graphene sheets that are chemically bonded by a carbon material in such a manner that the encapsulating shell is not permeable to the electrolyte of the intended lithium metal cell or sodium metal cell, but is permeable to lithium ions or sodium ions.

A specific object of the present invention is to provide porous graphene-metal hybrid particulates (including both lithium- or sodium-loaded particulates and those porous particulates without lithium or sodium pre-loaded therein) for use as an anode active material for a lithium metal and sodium metal secondary batteries that exhibit long and stable charge-discharge cycle life without exhibiting lithium or sodium dendrite problems.

SUMMARY OF THE INVENTION

The present invention provides porous graphene particulates for an alkali metal battery (lithium or sodium metal battery) and a process for producing such particulates directly from particles of a graphitic material and particles of an alkali metal attracting metal-coated sacrificial material. This process is simple, fast, cost-effective, and environmentally benign. The invention also provides a lithium metal battery and a sodium metal containing such particulates as an anode active material.

In a preferred embodiment, the invention provides a porous graphene particulate comprising a graphene shell encapsulating a porous core, wherein the porous core comprises one or a plurality of pores and pore walls and a lithium-attracting metal or sodium-attracting metal residing in the pores or deposited on the pore walls; wherein the lithium-attracting metal is selected from Au, Ag, Mg, Zn, Ti, Na, K, Al, Fe, Mn, Co, Ni, Sn, V, Cr, or an alloy thereof or the sodium-attracting metal is selected from Au, Ag, Mg, Zn, Ti, Li, K, Al, Fe, Mn, Co, Ni, Sn, V, Cr, or an alloy thereof, and is in an amount of 0.01% to 90% of the total particulate weight (more typically from 0.1% to 30%), and the graphene shell comprises multiple graphene sheets (not just one sheet) that contain single-layer or few-layer graphene, wherein the few-layer graphene sheets have 2-10 layers of stacked graphene planes having an inter-plane spacing $d_{002}$ from 0.3354 nm to 0.60 nm as measured by X-ray diffraction and the single-layer or few-layer graphene sheets contain a pristine graphene material having essentially zero % of non-carbon elements, or a non-pristine graphene material having 0.001% to 25% by weight of non-carbon elements.

The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

In certain embodiments, the graphene shell further comprises 0.01% to 40% by weight of a binder or matrix material that holds the multiple graphene sheets together as a composite shell.

The binder or matrix material may comprise an electron-conducting or lithium ion-conducting material. The electron-conducting material may be selected from an intrinsically conducting polymer, a pitch, a metal, a combination thereof, or a combination thereof with carbon, wherein the metal does not include Au, Ag, Mg, Zn, Ti, Li, Na, K, Al, Fe, Mn, Co, Ni, Sn, V, Cr, or an alloy thereof.

The intrinsically conducting polymer is preferably selected from (but not limited to) polyaniline, polypyrrole, polythiophene, polyfuran, polyacetylene, a bi-cyclic polymer, a sulfonated derivative thereof, or a combination thereof.

The lithium ion-conducting material may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1<y\leq4$.

In certain embodiments, the lithium ion-conducting material in the encapsulating shell contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis (fluorosulfonyl)imide, lithium trifluoromethanesulfonimide (LiTFSI), an ionic liquid-based lithium salt, or a combination thereof.

In some embodiments, the lithium ion-conducting material comprises a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

In some embodiments, the lithium ion-conducting material in the encapsulating shell comprises a sulfonated polymer, which is typically conductive to lithium ions or sodium ions.

In the porous graphene particulate, the pores may further contain an electron-conducting material, disposed therein, selected from a graphene sheet, expanded graphite flake, carbon nanotube, carbon nanofiber, carbon fiber, carbon particle, graphite particle, carbon black, acetylene black, pitch, an electron-conducting polymer, or a combination thereof. The electron-conducting polymer may be selected from (but not limited to) polyaniline, polypyrrole, polythiophene, polyfuran, polyacetylene, a bi-cyclic polymer, a sulfonated derivative thereof, or a combination thereof. Any intrinsically conductive polymer may be used for this purpose.

In some preferred embodiments, the porous graphene particulate further contains lithium metal or sodium metal residing in at least a pore of the particulate and in physical contact with the lithium-attracting metal or sodium-attracting metal to form a lithium-preloaded or sodium-preloaded graphene particulate.

The porous particulate is preferably pre-loaded with lithium or sodium metal (impregnated into the core to partially or completely fill the pores of the particulate) before the battery is made. Alternatively, the anode of the intended alkali metal battery contains a lithium source or a sodium source, in addition to the porous graphene particulates. The lithium source is preferably selected from foil, particles, or filaments of lithium metal or lithium alloy having no less than 80% by weight of lithium element in the lithium alloy. The sodium source is preferably selected from foil, particles, or filaments of sodium metal or sodium alloy having no less than 80% by weight of sodium element in the sodium alloy.

In the lithium or sodium metal battery, each cell contains an anode layer comprising the invented porous graphene particulates, which are pre-loaded with lithium or sodium. When the battery is discharged, lithium or sodium ions are released from the particulates and moved through an electrolyte/separator to the cathode comprising a cathode active material layer. The resulting partially or fully porous particulates will accommodate lithium or sodium when the battery is subsequently recharged. In some embodiments, the lithium or sodium metal battery further comprises a separate, discrete anode current collector (e.g. Cu foil) in contact with the anode. Typically, there is a separate, discrete cathode current collector (e.g. Al foil) in contact with the cathode active material layer (containing cathode active material, such as $MoS_2$, $TiO_2$, $V_2O_5$, $LiV_3O_8$, S, Se, etc.), which is supported by (coated on) the Al foil.

In some embodiments, the porous graphene particulate, when measured without the lithium- or sodium-attracting metal, has a density from 0.005 to 1.7 $g/cm^3$ and a specific surface area from 50 to 2,630 $m^2/g$. In certain embodiments, the particulate, when measured without the metal, has a density from 0.1 to 1.7 $g/cm^3$ and an average pore size from 2 nm to 50 μm, preferably from 100 nm to 10 μm. In some embodiments, the porous particulate has a physical density higher than 0.8 $g/cm^3$ and a specific surface area greater than 800 $m^2/g$. In some embodiments, the porous graphene particulate has a physical density higher than 1.0 $g/cm^3$ and a specific surface area greater than 500 $m^2/g$.

The graphene shell may comprise a non-pristine graphene material having a content of non-carbon elements in the range from 0.01% to 20% by weight and the non-carbon elements include an element selected from oxygen, fluorine, chlorine, bromine, iodine, nitrogen, hydrogen, or boron.

The invention also provides an alkali metal battery anode containing one or a plurality of the invented porous particulates as an anode active material. In certain embodiments, the alkali metal battery comprises a cathode, an anode containing the invented porous particulates, a lithium source or a sodium source in ionic contact with the anode, and an electrolyte in ionic contact with both the cathode and the anode. The lithium source may be selected from foil, particles, or filaments of lithium metal or lithium alloy having no less than 80% by weight of lithium element in the lithium alloy; or the sodium source is selected from foil, particles, or filaments of sodium metal or sodium alloy having no less than 80% by weight of sodium element in the sodium alloy.

The invention also provides (a) an alkali metal battery anode containing one or a plurality of the presently invented lithium-preloaded or sodium-preloaded graphene particulates as an anode active material and (b) an alkali metal battery comprising such an anode, a cathode, and an electrolyte in ionic contact with both the cathode and the anode.

The alkali metal battery may be a lithium metal battery, lithium-sulfur battery, lithium-selenium battery, lithium-air battery, sodium metal battery, sodium-sulfur battery, sodium-selenium battery, or sodium-air battery.

The invention further provides a powder mass comprising one or a plurality of particulates as described above. The powder mass may preferably comprise one or a plurality of the invented pporous particulates that are partially or fully impregnated or infiltrated with lithium or sodium, the so-called lithium-preloaded or sodium-preloaded graphene particulates.

The invention also provides a lithium-ion battery comprising an anode, a cathode, an electrolyte in ionic contact with the anode and the cathode, wherein the anode comprises a first anode active material, comprising one or a plurality of the invented lithium-preloaded graphene particulates, and a second anode active material, wherein the lithium-preloaded graphene particulates act as a lithium source for the second anode active material when an electrolyte is introduced into such an anode (comprising the two types of anode active material) or during a charge/discharge cycle of the lithium-ion battery. The lithium- or sodium-preloaded graphene particulates act to prelithiate or lithiate the second (or primary) anode active material. In other words, the presently invented lithium- or sodium-preloaded graphene particulates can serve as a prelithiating agent or pre-sodiating agent for any anode active material in a conventional lithium-ion battery or sodium-ion battery.

In the above-described lithium-ion battery, the second anode active material may be selected from the group consisting of: (A) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) alloys or intermetallic compounds of Si, Ge, Sn, Pb, Sb, Bi, Zn, Al, Ti, Ni, Co, or Cd with other elements; (C) oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) salts and hydroxides of Sn; (E) lithium titanate, lithium manganate, lithium aluminate, lithium-containing titanium oxide, lithium transition metal oxide; (F) graphite or carbon particles, filaments, fibers, nanofibers, nanotubes, or nanowires; and combinations thereof.

The invention also provides a sodium-ion battery comprising an anode, a cathode, an electrolyte in ionic contact with the anode and the cathode, wherein the anode comprises a first anode active material, comprising one or a plurality of the sodium-preloaded graphene particulates, and a second anode active material, wherein the sodium-preloaded graphene particulates act as a sodium source for the second anode active material when an electrolyte is introduce into such an anode or during a charge/discharge cycle of said sodium-ion battery. In such a sodium-ion battery, the second anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (d) graphite or carbon particles, filaments, fibers, nanofibers, nanotubes, or nanowires; and (e) combinations thereof.

Thus, the invention further provides a method of prelithiating or pre-sodiating a lithium-ion battery or sodium-ion battery, the method comprising an operation of combining lithium-preloaded or sodium-preloaded graphene particulates, as a first anode active material, and a second anode active material in an anode of a lithium-ion battery or sodium-ion battery and introducing an electrolyte into the anode. This step of introducing electrolyte into the anode may be accomplished before or after such an anode is incorporated with a cathode and a separator to form a battery cell.

Also provided in the invention is a process for producing porous graphene particulates for an alkali metal battery, the process comprising:
(a) Depositing particles or coating of a lithium-attracting metal or sodium-attracting metal onto particle surfaces of a sacrificial material to obtain metal-deposited sacrificial particles, wherein the lithium-attracting or sodium-attracting metal is selected from Au, Ag, Mg, Zn, Ti, Li, Na, K, Al, Fe, Mn, Co, Ni, Sn, V, Cr, an alloy thereof, or a combination thereof;
(b) encapsulating the metal-deposited sacrificial particles with multiple graphene sheets to produce graphene-embraced metal-deposited sacrificial particles; and
(c) (partially or completely) removing the sacrificial particles from the graphene-embraced metal-deposited sacrificial particles to form porous graphene particulates, wherein at least a porous graphene particulate comprises a graphene shell encapsulating a porous core, wherein the graphene shell comprises multiple graphene sheets and the porous core comprises one or a plurality of pores and pore walls and said lithium-attracting metal or sodium-attracting metal resides in the pores or is deposited on the pore walls.

The sacrificial material particles may be removed by, for instance, (a) dissolving the particles using an organic solvent or water, (b) melting the sacrificial material and allowing the material to flow out of the encapsulating shell, and (c) burning off the sacrificial material, etc. (in such a way that no carbon is produced to bond graphene sheets due to burning). The previously deposited lithium or sodium-attracting metal is found to typically adhere very well to interior surfaces of the encapsulating graphene sheets. The sacrificial material may be selected from a polymer (e.g. plastic, rubber, etc.), a low-melting metal preferably having a melting point lower than 500° C. (e.g. Sn, Zn, an alloy thereof, etc.), a water-soluble material (e.g. NaCl salt, sugar, etc.), a low-melting organic material preferably having a melting point lower than 200° C. (e.g. wax), an inorganic material that can be easily burnt off or dissolved in a solvent, a composite material (e.g. nanofiber reinforced water soluble material), or a combination thereof.

The polymer-based sacrificial material may be preferably selected from a water-soluble polymer (e.g. polyvinyl alcohol, polyacrylamide (PAM), polyacrylic acid (PAA), polyamines, polyethyleneimines, and quaternary ammonium compounds, polyvinylpyrrolidone (PVP), polyethylene oxide, polyethylene glycol, polypropylene oxide, polypropylene glycol, a copolymer thereof, or a combination thereof. Removal of such a sacrificial material can be easily and readily conducted by immersing the graphene-embraced metal-deposited sacrificial particles in water for a desired period of time to partially or completely dissolve the polymer enclosed inside the encapsulating graphene shell.

A composite-based sacrificial material may contain a reinforcement material (e.g. conductive carbon nanotubes or carbon nanofibers) dispersed in a matrix of a water-soluble or organic solvent-soluble material (e.g. salt, sugar, water-soluble polymer, etc.). This soluble matrix material may be dissolved and removed after the graphene shell-encapsulated metal-decorated particles are prepared, leaving behind the non-soluble nanotubes or nanofibers.

The sacrificial material is preferably made into a particle form having a diameter (or smallest dimension) from 100 nm to 100 µm, preferably from 0.5 µm to 20 µm and further preferably from 1 µm to 10 µm.

Decoration or deposition of a Li- or Na-attracting metal onto surfaces of sacrificial material particles prior to being subjected to graphene encapsulation may be accomplished via using various depositing or coating means (e.g. melt dipping, solution deposition, chemical vapor deposition, physical vapor deposition, sputtering, electrochemical deposition, etc.). Alternatively, one may choose to deposit a metal-containing precursor (e.g. an organo-metallic molecule) onto the particle surfaces prior to graphene encapsulation of the precursor-decorated particles of the sacrificial material. During the subsequent sacrificial material removal procedure (e.g. burning off of the sacrificial material) for the graphene-encapsulated precursor-decorated particles, the precursor is thermally converted or reduced to a metal phase, which typically resides in the pores of the particulates or adhering to the pore walls of the particulates.

For the purpose of defining the scope of the claims, the lithium- or sodium-attracting metal recited in Step (a) includes a precursor to this metal; such a precursor may be later chemically or thermally converted to the desired metal. For instance, the sacrificial material particle surfaces may be coated with $HAuCl_4$, which is thermally converted to Au when the underlying material is thermally carbonized. Another example is to deposit zinc chloride on polymer particle surfaces (e.g. via salt solution dipping and drying) and use hydrogen and methane to chemically convert this precursor to Zn metal at a later stage (e.g. before or after graphene deposition). There are many metal precursors to metals that are well-known in the art.

Step (b) of encapsulating the metal-deposited sacrificial particles with multiple graphene sheets may be conducted via several procedures to produce graphene-embraced metal-deposited sacrificial particles:

a) ball milling of a mixture containing multiple particles of the metal-decorated sacrificial material, particles of graphitic materials (e.g. pristine graphite, graphite oxide, graphite fluoride, graphite chloride, graphite bromide, graphite iodide, hydrogenated graphite, nitrogenated graphite, chemically functionalized graphite, or a combination thereof) that have never been intercalated and exfoliated, and optional ball milling media (e.g. zirconia balls, steel balls, or polymer pellets). Such a process is capable of peeling off graphene sheets from particles of graphitic materials and directly transferring these graphene sheets to surfaces of the sacrificial material particles or indirectly to mill ball surfaces first and then to surfaces of sacrificial material particles.

b) ball milling of a mixture containing multiple particles of the metal-decorated sacrificial material, multiple separated individual graphene sheets that have been previously made, and ball milling media (e.g. zirconia balls, steel balls, polymer beads, etc.). These graphene sheets can contain pristine graphene, graphene oxide, graphene fluoride, graphene chloride, graphene bromide, graphene iodide, hydrogenated graphene, nitrogenated graphene, chemically functionalized graphene, or a combination thereof. These types of isolated/separated graphene sheets (e.g. individual graphene oxide sheets have been exfoliated and isolated/separated from the precursor graphite oxide materials) can be produced via known processes.

c) extrusion of a mixture containing multiple metal-decorated particles of the sacrificial material, multiple separated individual graphene sheets that have been previously made, and an optional reinforcement or additive material (e.g. carbon nanotubes, carbon nanofibers, carbon black, acetylene black, expanded graphite flakes, etc.). Additional graphene sheets may be deposited on surfaces of the mixture particles using the ball-milling procedures described in (a) and (b) above.

d) Spray-drying of a suspension containing multiple metal-decorated particles of the sacrificial material, multiple separated individual graphene sheets (e.g. pristine graphene sheets, graphene oxide sheets, etc.), and an optional reinforcement or additive material dispersed in a liquid media (e.g. water or organic solvent).

In the aforementioned (a) and (b), the ball milling procedure is preferably conducted by using an energy impacting apparatus selected from a double cone mixer, double cone blender, vibratory ball mill, planetary ball mill, high energy mill, basket mill, agitator ball mill, cryogenic ball mill, microball mill, tumbler ball mill, attritor, continuous ball mill, stirred ball mill, pressurized ball mill, plasma-assisted ball mill, freezer mill, vibratory sieve, bead mill, nanobead mill, ultrasonic homogenizer mill, centrifugal planetary mixer, vacuum ball mill, or resonant acoustic mixer. In certain preferred embodiments, the procedure of operating the energy impacting apparatus is conducted in a continuous manner using a continuous energy impacting device.

The milling media may be selected from particles of a metal or metal alloy, a glass, a ceramic, a polymer, or a combination thereof.

In the invented process, the particles of a sacrificial material or the milling media may contain a polymer selected from the group consisting of polyamides, polycarbonate, polyester, polyethylene, high-density polyethylene, low-density polyethylene, polyethylene terephthalate, polypropylene, polystyrene, high impact polystyrene, polyurethanes, polyvinylchloride, polyvinylidene chloride, acrylonitrile butadiene styrene, polyepoxide, polymethyl methacrylate, polytetrafluoroethylene, phenolics (or phenol formaldehyde, melamine formaldehyde, urea-formaldehyde, polyetheretherketone, maleimide/bismaleimide, polyethrimide, polyimide, plastarch materials, polylactic acid, furan, silicone, polysulfone, natural rubber, bromo isobutylene isoprene rubber, polybutadiene, chloro isobutylene isoprene rubber, polychloroprene rubber, chlorosulphonated polyethylene, epichlorohydrin, ethylene propylene, ethylene propylene diene monomer (EPDM), fluorinated hydrocarbon rubber, fluoro silicone rubber, hydrogenated nitrile butadiene, polyisoprene rubber, isobutylene isoprene butyl rubber, methyl vinyl silicone rubber, acrylonitrile butadiene rubber, styrene butadiene rubber, styrene ethylene/butylene styrene rubber, polysiloxane rubber, polysiloxane rubber, and combinations thereof.

The invented process may further comprise a step of impregnating lithium metal or sodium metal into at least a pore of the porous graphene/carbon particulates, wherein the lithium metal or sodium metal partially or completely fills the pore(s) and is in physical contact with the lithium-attracting metal or sodium-attracting metal to form lithium-preloaded or sodium-preloaded graphene particulates.

The process may further comprise a step of incorporating said porous graphene particulates in an electrode for a lithium metal battery, lithium-sulfur battery, lithium-selenium battery, lithium-air battery, sodium metal battery, sodium-sulfur battery, sodium-selenium battery, or sodium-air battery.

In certain embodiments, the process may further comprise a step of incorporating the lithium-preloaded or sodium-preloaded graphene/carbon particulates in an anode electrode as a prelithiating agent or a pre-sodiating agent for a lithium metal battery, lithium-sulfur battery, lithium-selenium battery, lithium-air battery, sodium metal battery, sodium-sulfur battery, sodium-selenium battery, or sodium-air battery.

In certain embodiments, Step (a) of the invented process comprises depositing a precursor to lithium-attracting metal or sodium-attracting metal onto surfaces of polymer particles and Step (e) comprises thermally converting the precursor to said lithium-attracting metal or sodium-attracting metal.

In certain embodiments, Step (a) comprises depositing a precursor to lithium-attracting metal or sodium-attracting metal onto surfaces of polymer particles and then chemically or thermally converting the precursor to the lithium-attracting metal or sodium-attracting metal.

DESCRIPTION OF THE PREFERRED EMBODIMENTS

Figure 1:
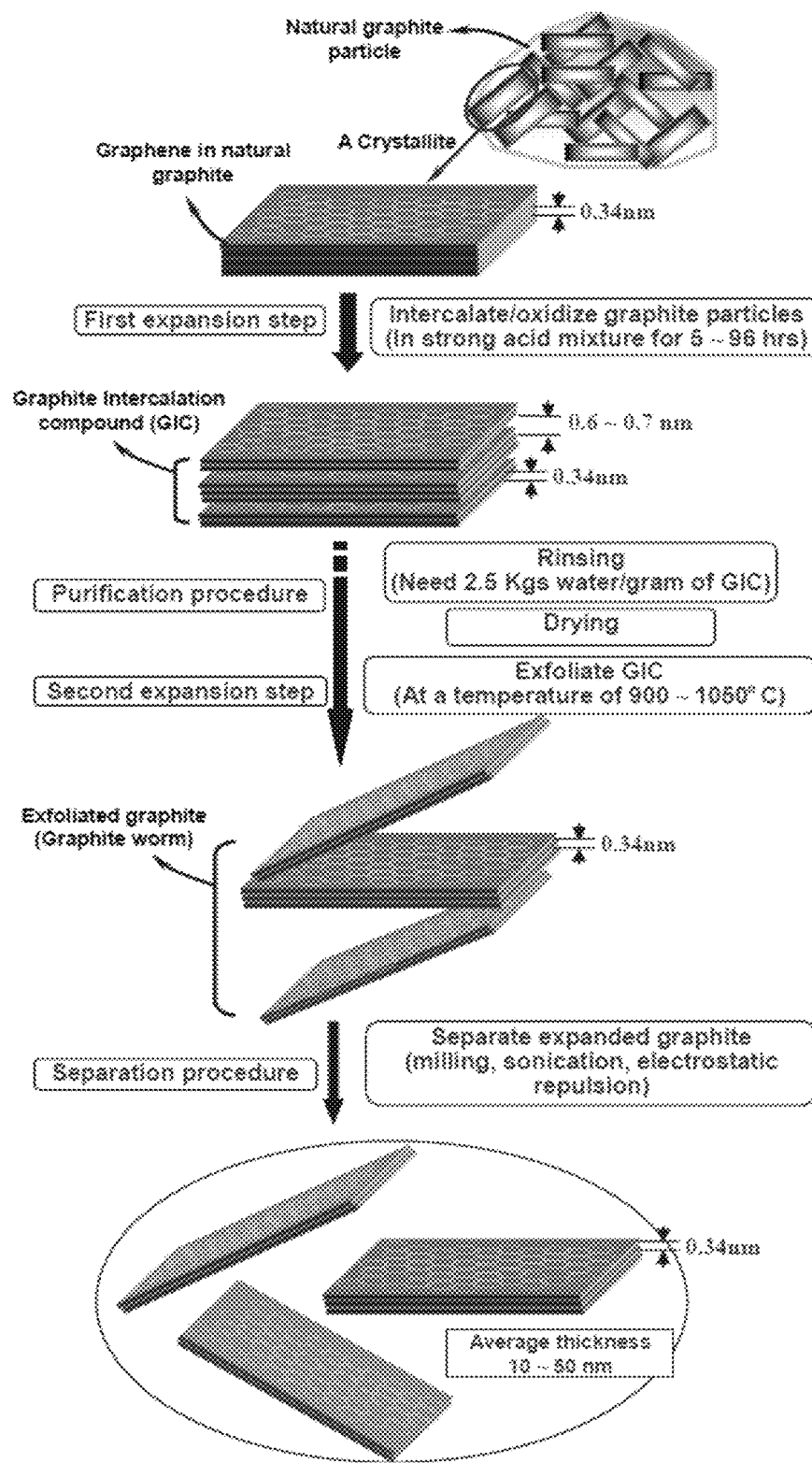
FIG. 1 A flow chart showing the most commonly used prior art process of producing highly oxidized graphene sheets (NGPs) that entails tedious chemical oxidation/intercalation, rinsing, and high-temperature exfoliation procedures.
Figure 2A:
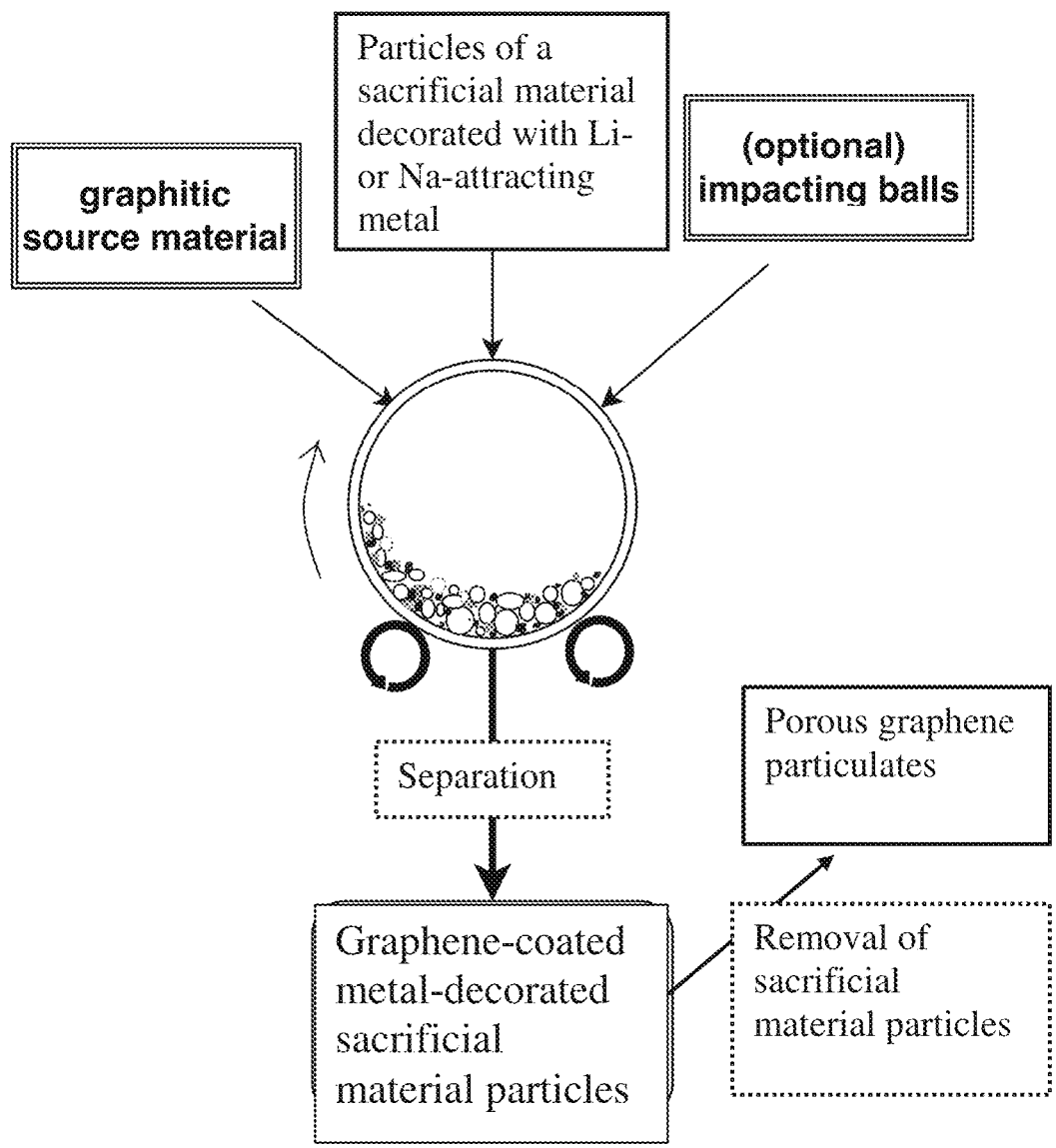
FIG. 2(A) A flow chart showing the presently invented process for producing porous graphene-metal hybrid particulates having a lithium- or sodium metal-attracting metal included in the pores of the particulates.
Figure 2B:
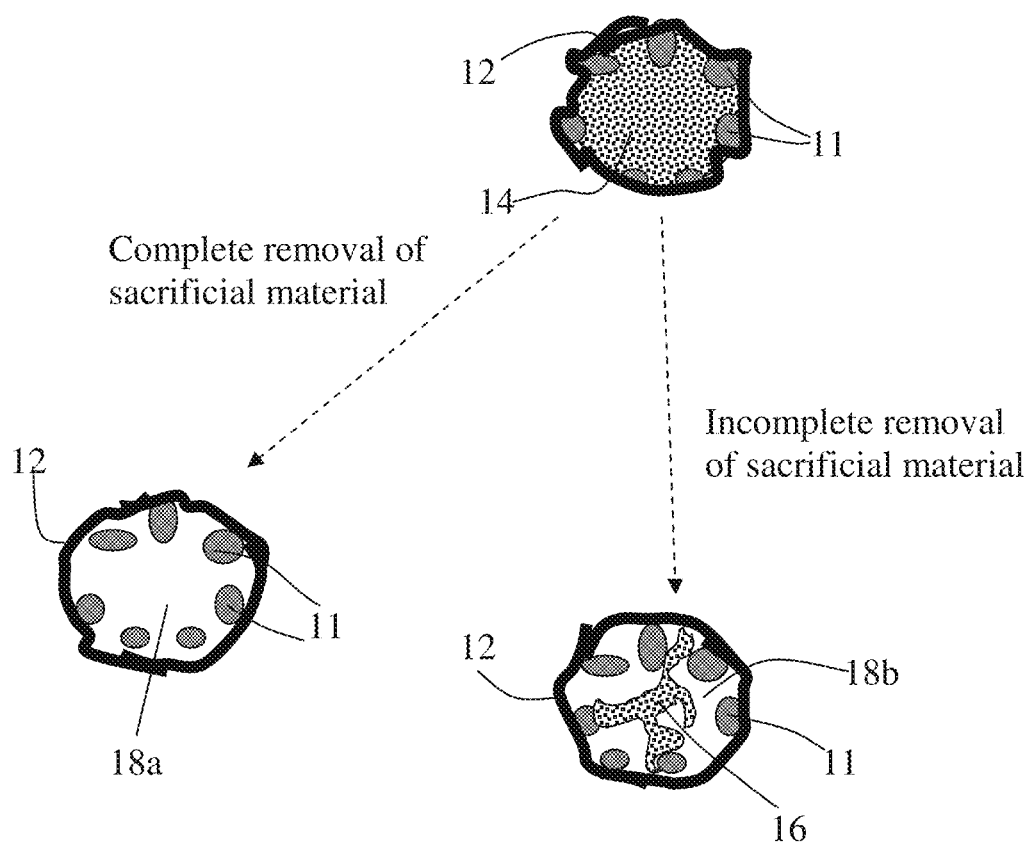
FIG. 2(B) Schematic of the sacrificial material-removing procedure that form pores in the porous graphene-metal hybrid particulates.
Figure 2C:
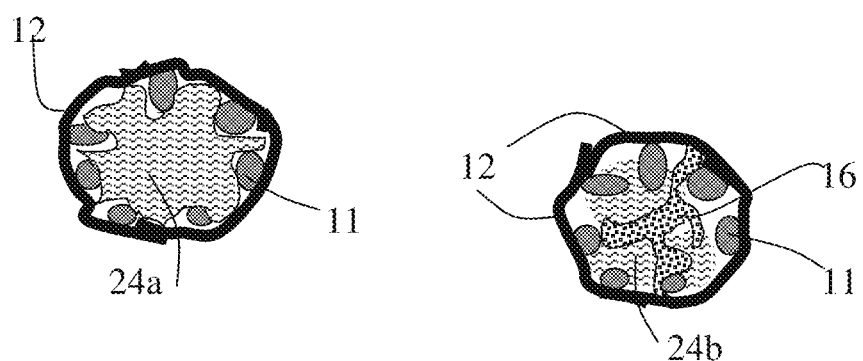
FIG. 2(C) The porous graphene-metal hybrid particulates containing a lithium- or sodium-attracting metal residing in the pores (e.g. coated on internal shell surfaces) of the graphene particulate. Lithium or sodium metal is attracted to fully or partially fill the pores of the particulate FIG. 2(D) Schematic of a prior art lithium metal battery cell.
Figure 2D:
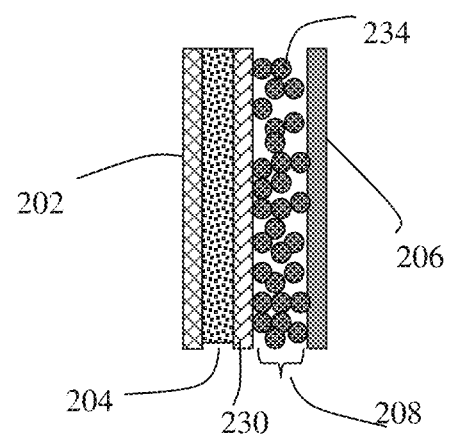

As schematically illustrated in FIG. 2(D), a prior art lithium metal cell is typically composed of an anode current collector 202 (e.g. Cu foil 8-12 μm thick), an anode active material layer 204 (e.g. a foil of lithium metal or lithium-rich metal alloy), a porous separator 230, a cathode active material layer 208 (containing a cathode active material, such as $V_2O_5$ and $MoS_2$ particles 234, and conductive additives that are all bonded by a resin binder, not shown), a cathode current collector 206 (e.g. Al foil), and an electrolyte disposed in ionic contact with both the anode active material layer 204 (also simply referred to as the "anode layer") and the cathode active material layer 208 (or simply "cathode layer"). The entire cell is encased in a protective housing, such as a thin plastic-aluminum foil laminate-based envelop. A prior art sodium metal cell is similarly configured, but the anode active material layer is a foil of sodium metal or sodium-rich metal, or particles of sodium.

The prior art lithium or sodium metal cell is typically made by a process that includes the following steps: (a) The first step is mixing and dispersing particles of the cathode active material (e.g. activated carbon), a conductive filler (e.g. acetylene black), a resin binder (e.g. PVDF) in a solvent (e.g. NMP) to form a cathode slurry; (b) The second step includes coating the cathode slurry on the surface(s) of an Al foil and drying the slurry to form a dried cathode electrode coated on the Al foil; (c) The third step includes laminating a Cu foil (as an anode current collector), a sheet of Li or Na foil (or lithium alloy or sodium alloy foil), a porous separator layer, and a cathode electrode-coated Al foil sheet together to form a 5-layer assembly, which is cut and slit into desired sizes and stacked to form a rectangular structure (as an example of shape) or rolled into a cylindrical cell structure; (d) The rectangular or cylindrical laminated structure is then encased in an aluminum-plastic laminated envelope or steel casing; and (e) A liquid electrolyte is then injected into the laminated structure to make a lithium battery cell.

Due to the high specific capacity of lithium metal and sodium metal, the highest battery energy density can be achieved by alkali metal rechargeable batteries that utilize a lithium metal or sodium metal as the anode active material, provided that a solution to the safety problem can be formulated. These cells include (a) the traditional Li or Na metal battery having a Li insertion or Na insertion compound in the cathode, (b) the Li-air or Na—$O_2$ cell that uses oxygen, instead of metal oxide, as a cathode (and Li or sodium metal as an anode instead of graphite or hard carbon), (c) the Li-sulfur or Na-S cell, (d) the lithium-selenium cell or sodium-selenium cell, and (e) the Li-graphene or Na-graphene cell using graphene as the main cathode active material.

The Li—$O_2$ battery is possibly the highest energy density electrochemical cell that can be configured today. The Li—$O_2$ cell has a theoretic energy density of 5,200 Wh/kg when oxygen mass is accounted for. A well configured Li—$O_2$ battery can achieve an energy density of 3,000 Wh/kg, which is 15-20 times greater than those of Li-ion batteries. However, current Li—$O_2$ batteries still suffer from poor energy efficiency, poor cycle efficiency, and dendrite formation issues. In the Li—S cell, elemental sulfur (S) as a cathode material exhibits a high theoretical Li storage capacity of 1,672 mAh/g. With a Li metal anode, the Li—S battery has a theoretical energy density of ~1,600 Wh/kg (per total weight of active materials). Despite its great potential, the practical realization of the Li—S battery has been hindered by several obstacles, such as low utilization of active material, high internal resistance, self-discharge, and rapid capacity fading on cycling. These technical barriers are due to the poor electrical conductivity of elemental sulfur, the high solubility of lithium polysulfides in organic electrolyte, the formation of inactivated $Li_2S$, and the formation of Li dendrites on the anode. Despite great efforts worldwide, dendrite formation remains the single most critical scientific and technological barrier against widespread implementation of all kinds of high energy density batteries having a Li metal anode.

We have discovered a highly dendrite-resistant, graphene/metal particulate-enabled Li metal cell or Na metal cell configuration that exhibits a high energy and/or high power density. Each battery cell contains multiple porous graphene particulates as an anode active material, wherein a lithium- or sodium-attracting metal, 11 in FIG. 2(C), is deposited on the pore walls (e.g. interior surfaces of encapsulating graphene sheets) or lodged inside the pores of these porous particulates. These graphene particulates are composed of an encapsulating shell comprising multiple graphene sheets (e.g. 12 in FIG. 2(B)) and pores (e.g. 18a and 18b in FIG. 2(B)) in the core to accommodate the lithium- or sodium-attracting metal, 11 in FIG. 2(C). The pores are formed when the sacrificial material (e.g. particle 14) is removed (e.g. polymer or sugar particles dissolved in a solvent or water, or wax that is burned off or melted and flowed out). Complete removal of the sacrificial material leads to the formation of macroscopic pores (e.g. 18a), having a size that can be >10 μm or can be made into smaller pores if the particle size is smaller. Partial removal of the sacrificial material leads to the formation of mesoscopic pores having a pore size range of 2-500 nm or even micron-scaled pores having a pore size from 0.5 μm to 10 μm (e.g. 18b). Partial removal results in the presence of some residual sacrificial material 16.

The lithium- or sodium-attracting metal material can contain a metal selected from Ti, V, Cr, Mn, Fe, Co, Ni, Cu, Zn, Zr, Mo, Pd, Ag, Cd, Au, Pt, W, Al, Sn, In, Pb, Bi, Na, Li, Mg, Ca, an alloy thereof, or a mixture thereof. Any transition metal can be used, but preferably, the metal is selected from Cu, Al, Ti, Sn, Ag, Au, Fe, Mn, Zn, or an alloy thereof.

The porous graphene-metal particulates can be lithiated (loaded with Li; e.g. 24a in FIG. 2(C) or sodiated (loaded with Na; e.g. 24b) before or after the cell is made. For instance, when the cell is made, a foil or particles of lithium or sodium metal (or metal alloy) may be implemented at the anode (e.g. between a layer of multiple porous graphene-metal particulates and a porous separator) to supply this layer of porous particulates with lithium or sodium. This lithiation or sodiation procedure can occur when the lithium or sodium foil layer is in close contact with the layer of porous graphene/carbon particulates and a liquid electrolyte is introduced into the anode or the entire cell.

Additionally, during the first battery discharge cycle, lithium (or sodium) is ionized, supplying lithium (or sodium) ions ($Li^+$ or $Na^+$) into electrolyte. These $Li^+$ or $Na^+$ ions migrate to the cathode side and get captured by and stored in the cathode active material (e.g. vanadium oxide, $MoS_2$, S, etc.). During the subsequent re-charge cycle of the battery, $Li^+$ or $Na^+$ ions are released by the cathode active material and migrate back to the anode. These $Li^+$ or $Na^+$ ions naturally diffuse through the pore walls to reach the lithium- or sodium-attracting metal lodged inside the pores or on the inner pore walls of the porous graphene particulates. In this manner, the particulates are said to be lithiated or sodiated.

Alternatively, the porous graphene particulates can be lithiated or sodiated (herein referred to as "prelithiated" or "pre-sodiated") electrochemically prior to being incorporated as an anode layer into the cell structure. This can be accomplished by bringing a mass of porous graphene-metal particles in contact with a lithium or sodium foil in the presence of a liquid electrolyte, or by implementing a layer of graphene-metal particulates as a working electrode and a lithium/sodium foil or rod as a counter-electrode in an electrochemical reactor chamber containing a liquid electrolyte. By introducing an electric current between the working electrode and the counter-electrode, one can introduce lithium or sodium into the pores of the particulates, wherein $Li^+$ or $Na^+$ ions diffuse into the pores of the particulates to initially form a lithium or sodium alloy with the lithium- or sodium-attracting metal pre-lodged therein. Presumably, such an initially formed alloy can acts as a buffer zone or as a heterogeneous nucleating seed to promote growth of lithium or sodium metal in the pores. Without the inclusion of a lithium- or sodium-attracting metal in the pores, the lithium or sodium metal has a tendency to get deposited on exterior surfaces of the graphene particulates, often leading to some dendrites of Li or Na.

Graphene is a single-atom thick layer of $sp^2$ carbon atoms arranged in a honeycomb-like lattice. Graphene can be readily prepared from graphite, activated carbon, graphite fibers, carbon black, and mesophase carbon beads. Single-layer graphene and its slightly oxidized version (GO) can have a specific surface area (SSA) as high as 2630 $m^2/g$. It is this high surface area that dramatically reduces the effective electrode current density, which in turn significantly reduces or eliminates the possibility of Li dendrite formation. However, we have unexpectedly observed that it is difficult for the returning lithium ions or sodium ions (those that return from the cathode back to the anode during battery charge) to uniformly deposit to graphene sheets and well-adhere to these graphene sheets in a porous graphene structure alone without the presence of a lithium- or sodium-attracting metal. Lithium or sodium has a high tendency to not adhere well to graphene surfaces or to get detached therefrom, thereby becoming isolated lithium or sodium clusters that no longer participate in reversible lithium/sodium storage. We have further surprisingly observed that such a lithium- or sodium-attracting metal, if present on the internal graphene surface or residing in pores of a graphene/carbon particulate, provides a safe and reliable site to receive and accommodate lithium/sodium during the battery charging step. The resulting lithium alloy or sodium alloy is also capable of reversibly releasing lithium or sodium ions into electrolyte that travel to the cathode side during the subsequent battery discharging step.

In some embodiments, the present invention provides a method of producing graphene-metal hybrid directly from particles of a graphitic material and metal-decorated particles of a sacrificial material (including metal precursor-decorated sacrificial particles). As schematically illustrated in FIG. 2(A), the method begins with mixing multiple particles of a graphitic material and multiple particles of a sacrificial material (herein "sacrificial particles") to form a mixture, wherein the surfaces of sacrificial particles are deposited (decorated) with a lithium- or sodium-attracting metal, in the form of a thin metal film or ultrafine particles (e.g. 1-100 nm). The mixture is enclosed in an impacting chamber of an energy impacting apparatus (e.g. a vibratory ball mill, planetary ball mill, high energy mill, basket mill, agitator ball mill, cryo ball mill, microball mill, tumbler ball mill, continuous ball mill, stirred ball mill, attritor mill, pressurized ball mill, freezer mill, vibratory sieve, bead mill, nanobead mill, ultrasonic homogenizer mill, centrifugal planetary mixer, vacuum ball mill, or resonant acoustic mixer). Optionally, milling balls (milling media, such as stainless steel balls, zirconia balls, and plastic beads) may also be added. When in operation, this energy impacting device imparts kinetic energy to the solid particles contained therein, allowing polymer particles and/or milling balls to impinge upon graphite particles with high intensity and high frequency.

In typical operational conditions, such impacting events result in peeling off of graphene sheets from the graphitic material and transferring the graphene sheets to surfaces of the sacrificial particles. These graphene sheets wrap around the metal-decorated sacrificial particles to form graphene-coated, metal-decorated sacrificial particles inside the impacting chamber. This is herein referred to as the "direct transfer" process, meaning that graphene sheets are directly transferred from graphite particles to surfaces of metal-decorated sacrificial particles without being mediated by any third-party entities.

Alternatively, a plurality of impacting balls or milling media can be added to the impacting chamber of the energy impacting apparatus. These impacting balls, accelerated by the impacting apparatus, impinge upon the surfaces/edges of graphite particles with a high kinetic energy at a favorable angle to peel off graphene sheets from graphite particles. These graphene sheets are tentatively transferred to surfaces of these impacting balls. These graphene-supporting impacting balls subsequently collide with metal-decorated sacrificial particles and transfer the supported graphene sheets to the surfaces of these metal-decorated sacrificial articles. This sequence of events is herein referred to as the "indirect transfer" process. These events occur in very high frequency and, hence, most of the metal-decorated sacrificial particles are covered by graphene sheets typically in less than one hour. In some embodiments of the indirect transfer process, step (c) includes operating a magnet to separate the impacting balls or media from the graphene-coated metal-decorated sacrificial particles.

The isolated, individual graphene coated metal-decorated sacrificial particles are then subjected to a sacrificial material removing procedure. The sacrificial material particles may be removed by, for instance, (a) dissolving the particles using a solvent, (b) melting the sacrificial material and allowing the material to flow out of the encapsulating shell, and (c) burning off the sacrificial material, etc. (in such a way that no carbon is produced to bond graphene sheets due to burning). The previously deposited lithium or sodium-attracting metal is found to typically adhere very well to interior surfaces of the encapsulating graphene sheets. The sacrificial material may be selected from a polymer (e.g. plastic, rubber, etc.), a low-melting metal (e.g. Sn, Zn, an alloy thereof, etc.), a water-soluble material (e.g. NaCl salt, sugar, etc.), a low-melting organic material (e.g. wax), an inorganic material that can be easily burnt off or dissolved in a solvent, a composite material (e.g. nanofiber reinforced water soluble material), or a combination thereof. Water-soluble salts or sugar powder may be mixed with a water-soluble polymer to form composite particles rigid enough to be included in a ball mill, for instance.

The polymer-based sacrificial material may be preferably selected from a water-soluble polymer (e.g. polyvinyl alcohol, polyacrylamide (PAM), polyacrylic acid (PAA), polyamines, polyethyleneimines, and quaternary ammonium compounds, polyvinylpyrrolidone (PVP), copolymers thereof, etc.). Removal of such a sacrificial material can be easily and readily conducted by immersing the graphene-embraced metal-deposited sacrificial particles in water for a desired period of time to partially or completely dissolve the polymer enclosed inside the encapsulating graphene shell.

A composite-based sacrificial material may contain a reinforcement material (e.g. conductive carbon nanotubes or carbon nanofibers) or an additive/filler dispersed in a matrix of a water-soluble or organic solvent-soluble material (e.g. salt, sugar, water-soluble polymer, etc.). This soluble matrix material may be dissolved and removed after the graphene shell-encapsulated metal-decorated sacrificial particles are prepared, leaving behind the non-soluble nanotubes or nanofibers.

Decoration or deposition of a Li- or Na-attracting metal onto sacrificial particle surfaces prior to being subjected to graphene encapsulation (e.g. via ball milling) may be accomplished via using various depositing or coating means (e.g. melt dipping, solution deposition, chemical vapor deposition, physical vapor deposition, sputtering, electro-chemical deposition, etc.). Alternatively, one may choose to deposit a metal-containing precursor (e.g. an organo-metallic molecule) onto the sacrificial particle surfaces prior to graphene encapsulation of the precursor-decorated sacrificial particles. During or after the subsequent sacrificial material removing treatment of the graphene-encapsulated precursor-decorated sacrificial particles, the precursor may be chemically or thermally converted or reduced to a metal phase, which typically resides in the pores of the particulates or adhering to the pore walls of the particulates.

Such porous graphene-metal particulates may be formed (e.g. along with a binder) into a shape and dimensions of a desired electrode (an anode). Such an electrode can be prelithiated or attached to a lithium foil and then directly impregnated with an electrolyte to form an electrolyte-impregnated electrode layer (e.g. anode). The anode layer, a separator, and a cathode layer can then be laminated (with or without an anode current collector and/or cathode current collector) to form a lithium battery cell, which is then packaged in an envelop or casing (e.g. laminated plastic-aluminum housing). Alternatively, an un-impregnated anode layer, a separator layer, and an un-impregnated cathode layer are laminated together (with or without externally added current collectors) to form a battery cell, which is then inserted in a housing and impregnated with an electrolyte to form a packaged lithium battery cell. A sodium cell may be produced in a similar manner.

In summary, the invention also provides a process for producing porous graphene particulates for an alkali metal battery. In certain embodiments, the process comprises:
  a) Depositing particles or coating of a lithium-attracting metal or sodium-attracting metal onto particle surfaces of a sacrificial material to obtain metal-deposited sacrificial particles, wherein the lithium-attracting or sodium-attracting metal is selected from Au, Ag, Mg, Zn, Ti, Li, Na, K, Al, Fe, Mn, Co, Ni, Sn, V, Cr, or an alloy thereof;
  b) encapsulating the metal-deposited sacrificial particles with multiple graphene sheets to produce graphene-embraced metal-deposited sacrificial particles; and
  c) (partially or completely) removing the sacrificial particles from the graphene-embraced metal-deposited sacrificial particles to form porous graphene particulates, wherein at least a porous graphene particulate comprises a graphene shell encapsulating a porous core, wherein the porous core comprises one or a plurality of pores and pore walls and said lithium-attracting metal or sodium-attracting metal resides in the pores or is deposited on the pore walls.

Step (b) of encapsulating the metal-deposited sacrificial particles with multiple graphene sheets may be conducted via several procedures to produce graphene-embraced metal-deposited sacrificial particles:
  A) Ball milling of a mixture containing multiple particles of the metal-decorated sacrificial material, particles of graphitic materials that have never been intercalated and exfoliated, and optional ball milling media. As discussed earlier, such a process is capable of peeling off graphene sheets from particles of graphitic materials and directly transferring these graphene sheets to surfaces of the sacrificial material particles or indirectly to mill ball surfaces first and then to surfaces of sacrificial material particles. The graphitic material may be selected from pristine graphite (natural graphite or synthetic graphite), graphite oxide, graphite fluoride, graphite chloride, graphite bromide, graphite iodide, hydrogenated graphite, nitrogenated graphite, chemically functionalized graphite, or a combination thereof);

B) Ball milling of a mixture containing multiple particles of the metal-decorated sacrificial material, multiple separated individual graphene sheets that have been previously made, and ball milling media (e.g. zirconia balls, steel balls, polymer beads, etc.);

C) Extrusion of a mixture containing multiple metal-decorated particles of the sacrificial material, multiple separated individual graphene sheets that have been previously made, and an optional reinforcement or additive material (e.g. carbon nanotubes, carbon nanofibers, carbon black, acetylene black, expanded graphite flakes, etc.). Additional graphene sheets may be deposited on surfaces of the mixture particles using the ball-milling procedures described in (a) and (b) above; or D) Spray-drying of a suspension containing multiple metal-decorated particles of the sacrificial material, multiple separated individual graphene sheets (e.g. pristine graphene sheets, graphene oxide sheets, etc.), and an optional reinforcement or additive material dispersed in a liquid media (e.g. water or organic solvent).

In the above (A) and (B) processes, the ball milling procedure is preferably conducted by using an energy impacting apparatus selected from a double cone mixer, double cone blender, vibratory ball mill, planetary ball mill, high energy mill, basket mill, agitator ball mill, cryogenic ball mill, microball mill, tumbler ball mill, attritor, continuous ball mill, stirred ball mill, pressurized ball mill, plasma-assisted ball mill, freezer mill, vibratory sieve, bead mill, nanobead mill, ultrasonic homogenizer mill, centrifugal planetary mixer, vacuum ball mill, or resonant acoustic mixer. In certain preferred embodiments, the procedure of operating the energy impacting apparatus is conducted in a continuous manner using a continuous energy impacting device.

The milling media may be selected from particles of a metal or metal alloy, a glass, a ceramic, a polymer, or a combination thereof.

The graphitic material, as a source of graphene sheets, may be selected from natural graphite, synthetic graphite, highly oriented pyrolytic graphite, graphite fiber, graphitic nanofiber, graphite fluoride, oxidized graphite, chemically modified graphite, exfoliated graphite, recompressed exfoliated graphite, expanded graphite, mesocarbon microbead, or a combination thereof. In this regard, there are several additional surprising elements associated with the presently invented process:

(1) Graphene sheets can be peeled off from natural graphite by using polymer particles alone, without utilizing the heavier and harder impacting balls (such as zirconium dioxide or steel balls commonly used in a ball mill, for instance). The peeled-off graphene sheets are directly transferred to metal-decorated sacrificial particle surfaces and are firmly wrapped around the sacrificial particles.

(2) It is also surprising that impacting metal-decorated sacrificial particles are capable of peeling off graphene sheets from artificial graphite, such as mesocarbon microbeads (MCMBs), which are known to have a skin layer of amorphous carbon.

(3) With the assistance of harder impacting balls, the graphene-like planes of carbon atoms constituting the internal structure of a carbon or graphite fiber can also be peeled off and transferred to the metal-decorated sacrificial particle surfaces. This has never been taught or suggested in prior art.

(4) The present invention provides a strikingly simple, fast, scalable, environmentally benign, and cost-effective process that avoids essentially all of the drawbacks associated with prior art processes of producing graphene sheets. The graphene sheets are immediately transferred to and wrapped around the metal-decorated sacrificial particles, which are then readily converted to graphene hybrid particulates.

A certain desired degree of hydrophilicity can be imparted to the pore walls of the graphene hybrid particulates if the starting graphite is intentionally oxidized to some degree (e.g. to contain 2-15% by weight of oxygen). Alternatively, one can attach oxygen-containing functional groups to the carbon phase if the carbonization treatment is allowed to occur in a slightly oxidizing environment.

If a high electrical or thermal conductivity is desired, the graphitic material may be selected from a non-intercalated and non-oxidized graphitic material that has never been previously exposed to a chemical or oxidation treatment prior to being placed into the impacting chamber.

Alternatively, as described in process (B), the starting material may include pre-made isolated graphene sheets. These graphene sheets (e.g. pristine graphene, graphene oxide, graphene fluoride, graphene chloride, graphene bromide, graphene iodide, nitrogenated graphene, hydrogenated graphene, etc.) can be produced from various known graphene production methods.

In certain preferred embodiments, the invention provides a process for producing porous graphene particulates for an alkali metal battery, the process comprising: (a) depositing particles or coating of a lithium-attracting metal or sodium-attracting metal onto particle surfaces of a sacrificial material to obtain metal-deposited (metal-decorated) sacrificial particles, wherein the lithium-attracting or sodium-attracting metal is selected from Au, Ag, Mg, Zn, Ti, Li, Na, K, Al, Fe, Mn, Co, Ni, Sn, V, Cr, or an alloy thereof; (b) mixing multiple particles of a graphitic material, the metal-deposited sacrificial particles, and an optional ball-milling media to form a mixture in an impacting chamber of an energy impacting apparatus; (c) operating said energy impacting apparatus with a frequency and an intensity for a length of time sufficient for peeling off graphene sheets from the graphitic material and transferring the graphene sheets to surfaces of the metal-deposited sacrificial particles to produce graphene-embraced metal-deposited sacrificial inside the impacting chamber; (d) recovering the graphene-embraced metal-deposited sacrificial particles from said impacting chamber; and (e) partially or completely removing the sacrificial particles from the graphene-embraced metal-decorated sacrificial particles to form porous graphene particulates, wherein at least a porous graphene particulate comprises a graphene shell encapsulating a porous core and wherein the graphene shell comprises multiple graphene sheets and the porous core comprises one or a plurality of pores and pore walls and the lithium-attracting metal or sodium-attracting metal resides in the pores or is deposited on the pore walls (e.g. on internal surfaces of the encapsulating shell. Preferably and typically, a majority or all of the particulates hold these structural features.

The graphitic material may be selected from pristine graphite, graphite oxide, graphite fluoride, graphite chloride, graphite bromide, graphite iodide, hydrogenated graphite, nitrogenated graphite, chemically functionalized graphite, or a combination thereof.

The process may further comprise a step of impregnating lithium metal or sodium metal into at least a pore of these porous particulates, wherein the lithium metal or sodium metal partially or completely fills the pore(s) and is in physical contact with the lithium-attracting metal or sodium-attracting metal to form lithium-preloaded or sodium-preloaded graphene particulates.

The energy impacting apparatus is preferably selected from a double cone mixer, double cone blender, vibratory ball mill, planetary ball mill, high energy mill, basket mill, agitator ball mill, cryogenic ball mill, microball mill, tumbler ball mill, attritor, continuous ball mill, stirred ball mill, pressurized ball mill, plasma-assisted ball mill, freezer mill, vibratory sieve, bead mill, nanobead mill, ultrasonic homogenizer mill, centrifugal planetary mixer, vacuum ball mill, or resonant acoustic mixer. Preferably, the procedure of operating the energy impacting apparatus is conducted in a continuous manner using a continuous energy impacting device.

The process may further comprise a step of adding 0.01% to 40% by weight of a binder or matrix material to hold the multiple graphene sheets in the encapsulating shell together as a composite shell. This may be accomplished for example by spraying a binder or matrix material onto the surfaces of graphene particulates. The binder or matrix material may comprise an electron-conducting or lithium ion-conducting material. The electron-conducting material may be selected from an intrinsically conducting polymer, a pitch, a metal, a combination thereof, or a combination thereof with carbon, wherein this metal does not include Au, Ag, Mg, Zn, Ti, Li, Na, K, Al, Fe, Mn, Co, Ni, Sn, V, Cr, or an alloy thereof. The intrinsically conducting polymer is selected from polyaniline, polypyrrole, polythiophene, polyfuran, polyacetylene, a bi-cyclic polymer, a sulfonated derivative thereof, or a combination thereof.

The lithium ion-conducting material is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\le1$, $1\le y\le 4$. The lithium ion-conducting material may contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof. Alternatively or additionally, the lithium ion-conducting material may comprise a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

In certain embodiments, the sacrificial material particles may be in the form of a composite material containing an electron-conducting material selected from a graphene sheet, expanded graphite flake, carbon nanotube, carbon nanofiber, carbon fiber, carbon particle, graphite particle, carbon black, acetylene black, pitch, an electron-conducting polymer, or a combination thereof. The electron-conducting polymer is preferably selected from polyaniline, polypyrrole, polythiophene, polyfuran, polyacetylene, a bi-cyclic polymer, a sulfonated derivative thereof, or a combination thereof.

The process may further comprise a step of combining a plurality of presently invented porous particulates together to form an anode electrode. The process may further comprise a step of combining a cathode, the anode electrode, a lithium source or a sodium source in ionic contact with said anode electrode, and an electrolyte in ionic contact with both the cathode and the anode electrode to form an alkali metal battery cell. The lithium source is selected from foil, particles, or filaments of lithium metal or lithium alloy having no less than 80% by weight of lithium element in the lithium alloy; or wherein the sodium source is selected from foil, particles, or filaments of sodium metal or sodium alloy having no less than 80% by weight of sodium element in the sodium alloy.

In-depth studies using a combination of SEM, TEM, selected area diffraction, X-ray diffraction, AFM, Raman spectroscopy, and FUR indicate that the graphene shells can comprise several large graphene planes (with length/width typically >>20 nm, more typically >>100 nm, often >>1 μm, and, in some cases, >>10 μm). These giant graphene planes are stacked and bonded along the thickness direction (crystallographic c-axis direction).

The graphene-metal particulates contain single-layer or few-layer graphene sheets in the encapsulating shell, wherein the few-layer graphene sheets have 2-10 layers of stacked graphene planes having an inter-plane spacing $d_{002}$ from 0.3354 nm to 0.36 nm as measured by X-ray diffraction and the single-layer or few-layer graphene sheets contain a pristine graphene material having essentially zero % of non-carbon elements, or a non-pristine graphene material having 0.01% to 25% by weight of non-carbon elements (more typically <15%) wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof. A plurality of single-layer or few layer graphene sheets embracing the underlying sacrificial particles can overlap with one another to form a stack of graphene sheets. The stack can have a thickness greater than 5 nm and, in some cases, greater than 10 nm or even greater than 100 nm, if deemed necessary.

The graphene particulates, without the Li- or Na-attracting metal, typically have a density from 0.001 to 1.7 $g/cm^3$, a specific surface area from 50 to 2,630 $m^2/g$. In a preferred embodiment, the encapsulating shell contains stacked graphene planes having an inter-planar spacing $d_{002}$ from 0.3354 nm to 0.40 nm as measured by X-ray diffraction.

The gaps between the free ends of the graphene sheets may be advantageously bonded by an intrinsically conducting polymer, a pitch, a metal, etc. This binder, coupling with graphene sheets, may constitute an encapsulating shell not permeable to liquid electrolyte, but permeable to lithium ions or sodium ions. Due to these unique chemical composition (including oxygen or fluorine content, etc.), morphology, crystal structure (including inter-graphene spacing), and structural features (e.g. degree of orientations, few defects, chemical bonding and no gap between graphene sheets, and substantially no interruptions along graphene plane directions), the graphene particulates have a unique combination of outstanding thermal conductivity, electrical conductivity, mechanical strength, stiffness (elastic modulus), and resistance to permeation by the liquid electrolyte.

The aforementioned features and characteristics make the graphene-metal hybrid particulates an ideal battery anode active material or a lithiating agent for the following reasons.

1) Since graphene sheets are bonded by a conducting material (e.g. conducting polymer, but not a carbon) to form an integral shell structure, such an encapsulating shell can prevent liquid electrolyte from permeating into the pore structure to get in direct contact with lithium metal, which is otherwise a source of interfacial instability.
2) Such integral graphene sheets bridged with a non-carbon conducting material also provide a network of electron-conducting pathways without interruption, allowing for low resistance to electron transport and enabling the option of reducing or eliminating the addition of an electron conductivity additive in the anode.
3) The lithium- or sodium-attracting metal included in the pores of the particulate enable the stable and safe storage of lithium or sodium metal that comes back from the cathode side during a recharge operation of the battery.
4) The porous graphene particulates pre-loaded with lithium or sodium metal, may be used as a prelithiating agent for an anode active material of a lithium-ion battery to overcome the loss of lithium or sodium ions due to the formation of solid-liquid interface (SEI) during battery charge/discharge cycles.
5) Thus, the presently invented process exhibits a host of many totally unexpected advantages over the conventional lithium or sodium metal battery cell electrode material production process.

Electrolyte is an important ingredient in a battery. A wide range of electrolytes can be used for practicing the instant invention. Most preferred are non-aqueous liquid, polymer gel, and solid-state electrolytes although other types can be used. Polymer, polymer gel, and solid-state electrolytes are preferred over liquid electrolyte.

The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) effective in suppressing the reductive or oxidative decomposition of electrolyte; and (b) high in conductivity. A non-aqueous electrolyte solely composed of ethylene carbonate (EC) is advantageous in that it is relatively stable against carbonaceous filament materials. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methane-sulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 3.5 mol/l.

For sodium metal batteries, the organic electrolyte may contain an alkali metal salt preferably selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN($CF_3SO_2)_2$), bis-trifluoromethyl sulfonylimide potassium (KN($CF_3SO_2)_2$), an ionic liquid salt, or a combination thereof.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion.

This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a battery.

The cathode active material may be selected from a wide variety of oxides, such as lithium-containing nickel oxide, cobalt oxide, nickel-cobalt oxide, vanadium oxide, and lithium iron phosphate. These oxides may contain a dopant, which is typically a metal element or several metal elements. The cathode active material may also be selected from chalcogen compounds, such as titanium disulfate, molybdenum disulfate, and metal sulfides. More preferred are lithium cobalt oxide (e.g., $Li_xCoO_2$ where $0.8 \le x \le 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate, and the like. Sulfur or lithium polysulfide may also be used in a Li—S cell.

The rechargeable lithium metal batteries can make use of non-lithiated compounds, such as $TiS_2$, $MoS_2$, $MnO_2$, $CoO_2$, $V_3O_8$, and $V_2O_5$, as the cathode active materials. The lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$. In general, the inorganic material-based cathode materials may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nanodisc, nanoribbon, or nanoplatelet form. These materials can be in the form of a simple mixture with sheets of a graphene material, but preferably in a nanoparticle or nanocoating form that that is physically or chemically bonded to a surface of the graphene sheets.

Preferably, the cathode active material for a sodium metal battery contains a sodium intercalation compound or a potassium intercalation compound selected from $NaFePO_4$, $KFePO_4$, $Na_{(1-x)}K_xPO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, $NiHCF$, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$ (y/z=0.01 to 100), Se, Alluaudites, or a combination thereof, wherein x is from 0.1 to 1.0.

The organic material or polymeric material-based cathode materials may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-B enzylidene hydantoin, Isatine lithium salt, Pyromelitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, $Na_xC_6O_6$ (x=1-3), $Na_2(C_6H_2O_4)$, $Na_2C_8H_4O_4$ (Na terephthalate), $Na_2C_6H_4O_4$(Li trans—trans-muconate), or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio) benzene] (PTKPTB, or poly[3,4(ethylenedithio)thiophene] (PEDTT).

The organic material that can be used as a cathode active material in a lithium metal battery or sodium metal battery may include a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The following examples are used to illustrate some specific details about the best modes of practicing the instant invention and should not be construed as limiting the scope of the invention.

EXAMPLE 1

Production of Graphene Particulates from Flake Graphite Via Polyvinylpyrrolidone Powder-Based Sacrificial Material Particles Polyvinylpyrrolidone (PVP) was dissolved in water to obtain a 5% polymer solution, which was atomized and dried in a spray-drier to obtain PVP particles having a diameter from 3 to 35 μm. For incorporation of higher melting point metals (e.g. Au, Ag, Ni, Co, Mn, Fe, and Ti) as a lithium- or sodium-attracting metal in porous graphene particulates, a small but controlled amount of the desired metal was deposited on the surfaces of PVP particles using sputtering or chemical solution deposition of a precursor material (e.g. $HAuCl_4$, which upon heating at a desired temperature, becomes Au metal). These metal-decorated polymer particles were then utilized as the impacting media (with or without using any externally added milling media, such as steel balls).

Then, 1 kg of metal-decorated PVP particles, 50 grams of flake graphite, 50 mesh (average particle size 0.18 mm; Asbury Carbons, Asbury N.J.) and 250 grams of magnetic steel balls were placed in a high-energy ball mill container. The ball mill was operated at 300 rpm for 2 hours. The container lid was removed and stainless steel balls were removed via a magnet. The PVP particles were found to be coated with a dark graphene layer.

A sample of the coated carrier material was then immersed in water at 80° C. for 2 hours under the influence of a tip ultrasonicator to dissolve PVP and allow isolated/separated graphene sheets to disperse in water for the purpose of determining the nature of graphene sheets produced. After solvent removal, isolated graphene sheet powder was recovered and was found to be mostly few-layer graphene sheets.

Polypyrrole (PPy) soluble in chloroform and m-cresol was chemically synthesized by using ammonium persulfate as an oxidant and dodecylbenzene sulfonic acid as a dopant source The remaining graphene-coated metal-decorated PVP particles were then dipped in and removed from a Polypyrrole/chloroform solution for 2 minutes, enabling PPy to bond together graphene sheets and impart structural integrity thereto. The PPy-bonded, graphene-coated metal-decorated PVP particles were then immersed in water without ultrasonication to produce a sample of porous graphene particulates.

In a separate experiment, the same batch of metal-decorated PVP particles and flake graphite particles (without the impacting steel balls) were placed in the same high-energy ball mill container and the ball mill was operated under the same conditions for the same period of time. The results were compared with those obtained from impacting ball-assisted operation. The separate graphene sheets isolated from PVP particles, upon PVP dissolution, are mostly single-layer graphene. The graphene particulates produced from this process have a higher level of porosity (lower physical density).

Although PVP is herein used as an example of water-soluble polymer, the carrier material for graphene particulate production is not limited to PVP. It does not have to be a water-soluble polymer either. However, preferably, the polymer is soluble in water or a benign organic solvent to reduce the environmental impact. The sacrificial polymer could be any polymer provided the polymer can be made into a particulate form.

In order to determine the relative stability of the graphene-metal hybrid particulate-based anode structure, the voltage profiles of symmetric layered Li-metal-decorated graphene particulate-containing layer electrode cells, symmetric layered Li-(metal free) graphene particulate electrode cells, and the bare Li foil counterparts were obtained through over 200 cycles at nominal current density of 1 $mA/cm^2$. The graphene particulate-containing layer electrode was made by the conventional slurry coating procedure using PVDF as a binder.

The symmetric layered Li-graphene particulate electrode cells exhibited stable voltage profiles with negligible hysteresis, whereas the bare Li foils displayed a rapid increase in hysteresis during cycling, by almost 100% after 100 cycles. The hysteresis growth rate of the symmetric layered Li-(metal free) graphene electrode cell is significantly greater than that of the symmetric layered Li-metal-decorated graphene particulate-containing layer electrode cell, but lower than that of the bare Li foil cell. For symmetric layered Li-metal-decorated graphene particulate-containing layer electrode cells, flat voltage plateau at both the charging and discharging states can be retained throughout the whole cycle without obvious increases in hysteresis. This is a significant improvement compared with bare Li electrodes, which showed fluctuating voltage profiles with consistently higher overpotential at both the initial and final stages of each stripping/plating process. After 300 cycles, there is no sign of dendrite formation and the lithium deposition is very even in symmetric layered Li-metal-decorated graphene particulate-containing layer electrode cells. For the symmetric layered Li-(metal-free) metal-decorated graphene particulate-containing layer electrode cells, some lithium tends to deposit unevenly on external surfaces of pores, instead of fully entering the pores. Typically, for bare Li foil electrodes, dendrite begins to develop in less than 30 cycles.

EXAMPLE 2

Production of Porous Graphene Particulates Using Expanded Graphite (>100 nm in Thickness) as the Graphene Source and Acrylonitrile-Butadiene-Styrene Copolymer (ABS) as the Sacrificial Particles The ABS particles were decorated with a small amount of lithium- or sodium-attracting metal (0.1% to 30% by weight of Mg, Zn, Na, and Sn) using electroplating or sputtering. Then, in an experiment, 100 grams of metal-decorated ABS pellets, as the sacrificial material particles, were placed in a plastic container along with 5 grams of expanded graphite. This container was part of an attritor mill, which was operated for 30 minutes-2 hours. After processing, metal-decorated particles of the sacrificial material were found to be coated with a thin layer of graphene-like material. A small sample of graphene-coated sacrificial material was placed in acetone and subjected to ultrasound energy to speed dissolution of the ABS. The solution was filtered using an appropriate filter and washed four times with additional acetone. Subsequent to washing, filtrate was dried in a vacuum oven set at 60° C. for 2 hours. This sample was examined by optical microscopy and Raman spectroscopy, and found to be graphene.

The remaining graphene-coated metal-decorated ABS particles were then immersed in acetone, without ultrasonication, to produce graphene particulates under different dissolution temperature and time conditions to obtain porous particulates of different porosity levels.

EXAMPLE 3

Production of Porous Graphene Particulates from Mesocarbon Microbeads (MCMBs) as the Graphene Source Material and Composite Particles of Vapor-Grown Carbon Nanofiber (CNF) Reinforced Polyacrylamide (PAM) as the Sacrificial Material Particles PAM powder was dissolved in water to obtain a 5% polymer solution, to which a small amount of CNFs was added to obtain a slurry (having a CNF/PAM weight ratio of 5/100) under the influence of ultrasonication. The slurry was spray-dried to produce composite particles having a diameter from 6.5 to 25. The CNF/PAM composite particles were deposited with a small amount of lithium- or sodium-attracting metal (0.1% to 35% by weight of Mg, Zn, Na, K, Li, and Sn).

Subsequently, 100 grams of metal-decorated CNF/PAM composite particles, 5 grams of MCMBs (China Steel Chemical Co., Taiwan), and 50 grams of zirconia beads were placed in a vibratory ball mill and processed for 2 hours. After the process was completed, the vibratory mill was then opened and the metal-decorated particles were found to be coated with a dark coating of graphene sheets. The zirconia particles, having distinctly different sizes and colors were manually removed. The graphene-coated metal-decorated CNF/PAM particles were then immersed in water at 80° C. for 0.5-5 hour to partially remove PAM, forming porous graphene particles having a core of PAM-bonded CNFs and pores. The level of porosity was controlled by adjusting the percentage of PAM dissolved out of the composite particles.

EXAMPLE 4

Particles of Sugar/PEO Composite Particles as the Sacrificial Material in a Tumbler Mill Powders of sugar and polyethylene oxide (PEO), at a weight ratio of sugar/PEO=1/1, were dissolved in water to obtain a 7% by weight solution. The solution was extruded out via an extruder into a coagulating bath of benzene to produce composite particles of approximately 3 mm in size. These pellets were further reduced in size by using an air jet mill to approximately 15-45 µm in size.

In one experiment, 10 grams of Ag-coated or Au-coated sugar/PEO particles were placed in a tumbler mill container along with 0.25 grams of HOPG powder derived from graphitized polyimide and a magnetic stainless steel impactor. The same experiment was performed, but the mill container did not contain any impactor balls. These processes were carried out in a 1%-humidity "dry room" to reduce the condensation of water onto the completed product. The mill was operated for 30-120 minutes. After operation, the contents of the container were sorted to recover graphene-coated metal-decorated particles by removing residual HOPG powder and impactor balls (when used).

The resulting graphene-wrapped, metal-decorated particles in both cases (with or without impactor balls) were examined using both digital optical microscopy and scanning electron microscopy (SEM). It was observed that the thickness of the graphene sheets wrapped around particles increases with the milling operation time and, given the same duration of operation, the impactor-assisted operation leads to thicker graphene coating.

A mass of graphene-wrapped, metal-coated particles were then immersed in a water bath at 60° C. for 1-5 hours to obtain graphene particulates containing Ag or Au coated on internal surfaces of graphene.

EXAMPLE 5

Natural Graphite Particles as the Graphene Source, Expanded Graphite Flake/Wax Composite Particles as the Sacrificial Material, and Optional Ceramic or Glass Beads as Added Impacting Balls A mixture of expanded graphite (EP) flakes (35% by wt.) and candle wax material were extruded and pelletized into particles having a size of 2.5-5.2 mm, which were further reduced in size via air jet milling to form particles of 12-35 µm in diameter. The composite particles were electrochemically deposited with a small amount of lithium- or sodium-attracting metal (0.1% to 15% by weight of Mg, Zn, Mn, and Sn). These EP/wax composite particles were rapidly dipped into and retreated from a urethane monomer/oligomer solution to deposit an ultrathin layer of polyurethane resin that wrap around the composite particles.

In a subsequent experiment, 0.5 kg of metal-decorated EP/wax composite particles, 50 grams of natural graphite (source of graphene sheets) and 250 grams of zirconia powder (impacting balls) were placed in containers of a planetary ball mill. The ball mill was operated at 300 rpm for 4 hours. The container lid was removed and zirconia beads (different sizes and weights than graphene-coated composite particles) were removed through a vibratory screen. The metal-decorated composite particles were found to be coated with a dark graphene layer. The resulting graphene-encapsulated, metal-decorated composite particles were placed over a 50 mesh sieve and a small amount of unprocessed flake graphite was removed. In a separate experiment, glass beads were used as the impacting balls; other ball-milling operation conditions remained the same.

A mass of graphene-coated EP/wax composite particles was then exposed to a wax vaporization temperature at approximately 180° C. to vaporize wax without creating a carbon material from wax. The resulting particulates contain an encapsulating graphene shell enclosing a core that comprises pores, EP flakes residing in pores, and the lithium- or sodium-attracting metal adhering to the encapsulating shell. EP flakes were used as an example of the electron-conducting material that can be included in the pores of the porous graphene particulates.

EXAMPLE 6

Preparation of Porous Graphene Fluoride Particulates

In a typical procedure, a powder mass of graphene particulates prepared in Example 5 was fluorinated by vapors of chlorine trifluoride in a sealed autoclave reactor to yield fluorinated graphene hybrid particulates. Different durations of fluorination time were allowed for achieving different degrees of fluorination. Compared to pristine graphene and reduced graphene oxide-based porous particulates, the graphene fluoride particulates were found to be more chemically compatible with the commonly used electrolytes in lithium-ion battery industry.

EXAMPLE 7

Preparation of Graphene Oxide Particulates and Nitrogenated Graphene Particulates Several samples of graphene particulates prepared in Example 3 were immersed in a 30% $H_2O_2$-water solution for a period of 2-48 hours to obtain graphene oxide (GO) particulates, having an oxygen content of 2-25% by weight.

Some GO particulates were mixed with different proportions of urea and the mixtures were heated in a microwave reactor (900 W) for 0.5 to 5 minutes. The products were washed several times with deionized water and vacuum dried. The products obtained were nitrogenated graphene particulates. The nitrogen contents were from 3 wt. % to 17.5 wt. %, as measured by elemental analysis.

EXAMPLE 8

Evaluation of Various Lithium Metal and Sodium Metal Cells

In a conventional cell, an electrode (e.g. cathode) is typically composed of 85% an electrode active material (e.g. $MoS_2$, $V_2O_5$, inorganic nanodiscs, etc.), 5% Super-P (acetylene black-based conductive additive), and 10% PTFE, which were mixed in NMP solvent to form a slurry. The slurry was then coated on Al foil. The thickness of electrode was around 50-150 μm. A wide variety of cathode active materials were implemented to produce lithium metal batteries and sodium metal batteries. Anode layers were similarly made using porous graphene particulates as an anode active material. Some of the porous particulates were preloaded with lithium or sodium metal. Several lithium-ion cells were also made that comprised lithium-preloaded graphene particulates as a first anode active material and a conventional anode material (e.g. particles of graphite or Si) as a second anode active material in the anode. The graphene particles pre-loaded with lithium were used as a prelithiating agent for the conventional anode active material.

For each sample, both coin-size and pouch cells were assembled in a glove box. The charge storage capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

For each sample, several current density (representing charge/discharge rates) were imposed to determine the electrochemical responses, allowing for calculations of energy density and power density values required of the construction of a Ragone plot (power density vs. energy density).

Figure 3A:
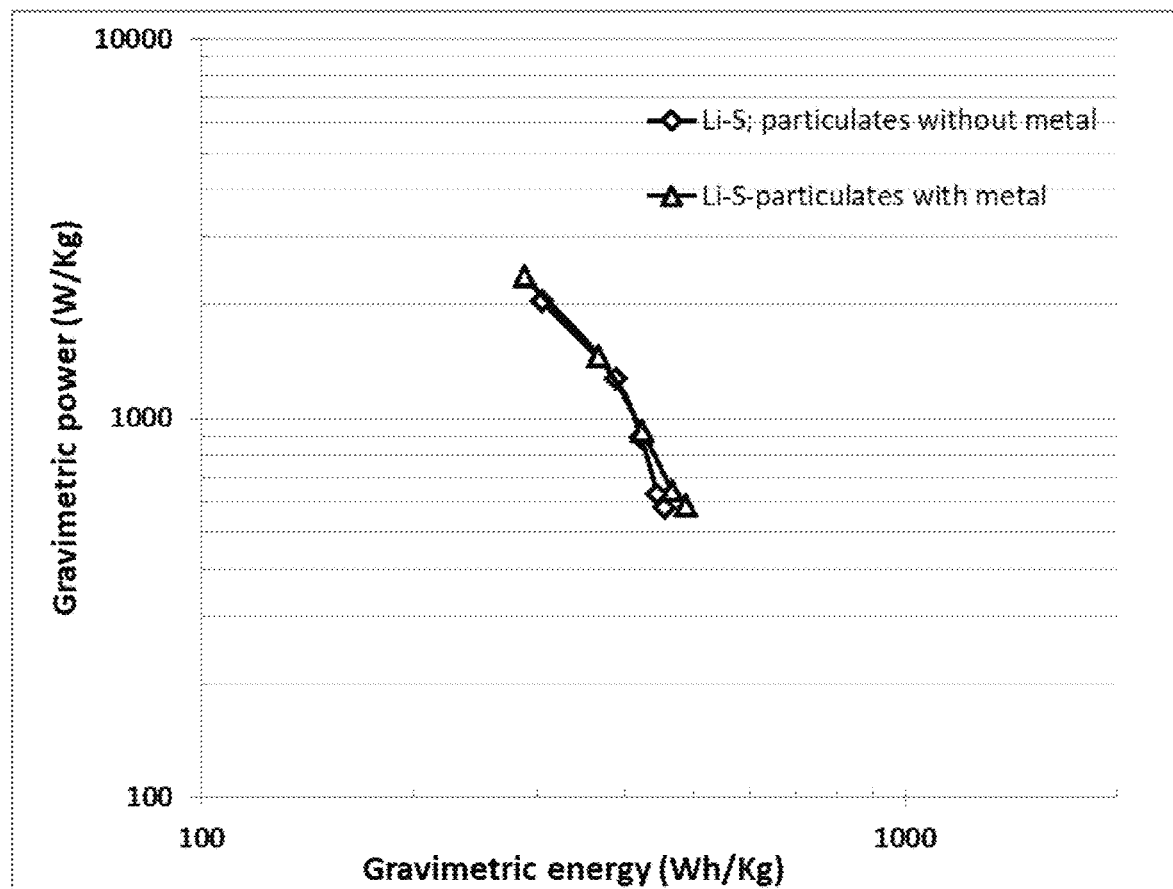
FIG. 3(A) Ragone plots (gravimetric power density vs. energy density) of two sets of lithium metal cells: (a) first cell containing porous nitrogen-doped graphene-metal (Zn) hybrid particulates, in physical contact with a lithium foil, as the anode active material; (b) the second cell containing no lithium-attracting metal (Zn).
Figure 3B:
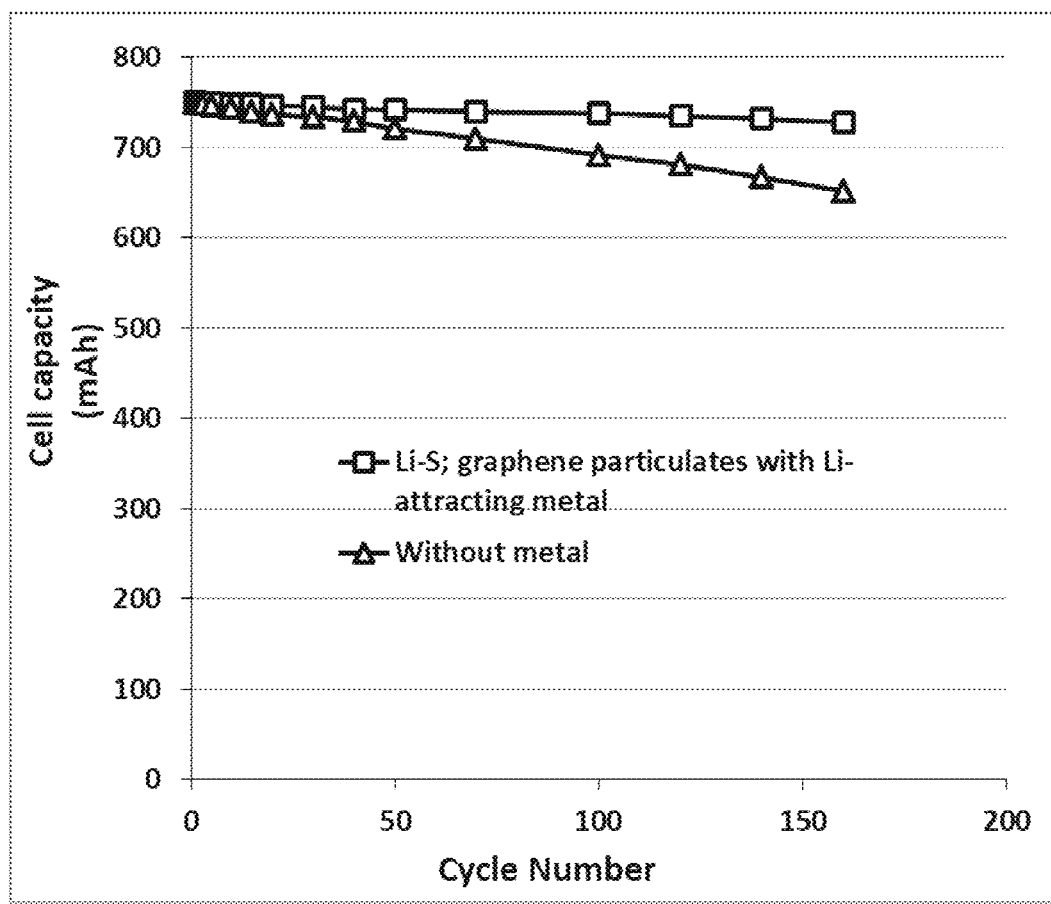
FIG. 3(B) The cycling behaviors of two sets of lithium metal cells: (a) first cell containing nitrogen-doped graphene-metal (Zn) hybrid particulates, in physical contact with a lithium foil, as the anode active material; (b) the second cell containing no lithium-attracting metal (Zn).

Shown in FIG. 3(A) are Ragone plots (gravimetric power density vs. energy density) of two sets of lithium metal cells: (a) first cell containing a layer of porous nitrogen-doped graphene-metal (Zn) particulates bonded by PVDF, in physical contact with a lithium foil, as the anode active material; (b) the second cell containing no lithium-attracting metal (Zn) inside the porous graphene particulates. These plots indicate that the energy density and power density ranges of these two cells are comparable. However, SEM examination of the cell samples, taken after 30 charge-discharge cycles, indicates that the sample containing a Li-attracting metal has essentially all the lithium ions returning from the cathode during charge being encased inside pores of the particulates, having no tendency to form lithium dendrites. In contrast, for the cell containing no lithium-attracting metal inside the pores, lithium metal tends to get re-plated on external surfaces of graphene particulates in a less uniform manner. Further surprisingly, as shown in FIG. 3(B), the cell containing nitrogen-doped graphene-metal (Zn) particulates exhibits a more stable cycling behavior.

Figure 4:
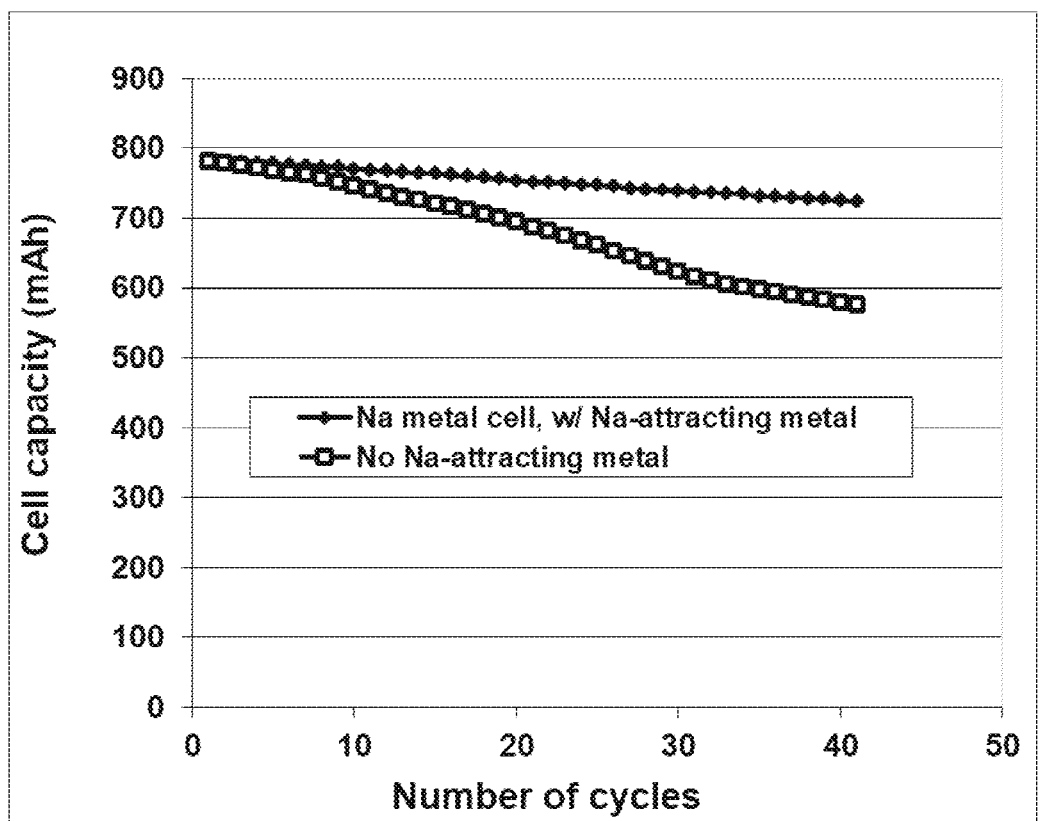
FIG. 4 The battery cell capacity decay curves of two sodium metal cells: one cell containing pristine graphene-metal (Mg) particulates and a sheet of Na foil as the anode active material and $NaFePO_4$ as the cathode active material, and the other cell containing porous pristine graphene particulates (but no sodium-attracting metal included therein) and a sheet of Na foil as the anode active material.

Shown in FIG. 4 are battery cell capacity decay curves of two sodium metal cells. One cell contains a layer of pristine graphene-metal (Mg) particulates and a sheet of Na foil as the anode active material, and $NaFePO_4$ as the cathode active material. For comparison, a sodium metal cell containing pristine graphene particulates (but no sodium-attracting metal included therein) and a sheet of Na foil as the anode active material is also investigated. The cell having a sodium-attracting metal residing in pores of graphene particulates shows a significantly more stable cycling behavior.

In conclusion, we have successfully developed a new, novel, unexpected, and patently distinct class of highly conducting porous graphene-metal hybrid particulates that can be used in a lithium metal battery or sodium metal battery for overcoming the dendrite issues. This class of new materials has now made it possible to use lithium metal and sodium metal batteries that have much higher energy densities as compared to the conventional lithium-ion cells. Additionally, the graphene-metal hybrid particulates, preloaded with lithium or sodium, may be used as a prelithiating agent or pre-sodiating agent for a conventional lithium-ion battery or sodium-ion battery, respectively.

The invention claimed is:

1. A porous graphene particulate comprising a graphene shell encapsulating a porous core, wherein said porous core comprises one or a plurality of pores and pore walls and a lithium-attracting metal or sodium-attracting metal residing in said pores or deposited on said pore walls; wherein said lithium-attracting metal is selected from Au, Ag, Mg, Zn, Ti, Na, K, Al, Fe, Mn, Co, Ni, Sn, V, Cr, or an alloy thereof or said sodium-attracting metal is selected from Au, Ag, Mg, Zn, Ti, Li, K, Al, Fe, Mn, Co, Ni, Sn, V, Cr, or an alloy thereof, and is in an amount of 0.1% to 90% of the total particulate weight, and said graphene shell comprises multiple graphene sheets wherein said graphene shell further comprises 0.01% to 40% by weight of a binder or matrix material that holds said multiple graphene sheets together as a composite shell;

wherein said binder or matrix material comprises an electron-conducting or lithium ion-conducting material;

wherein said electron-conducting material is selected from an intrinsically conducting polymer, a pitch, a metal, a combination thereof, or a combination thereof with carbon, wherein said metal does not include Au, Ag, Mg, Zn, Ti, Li, Na, K, Al, Fe, Mn, Co, Ni, Sn, V, Cr, or an alloy thereof; and wherein said lithium ion-conducting material is selected from $Li_2CO_3$, $Li_2O$, $Li_2C_2O_4$, LiOH, LiX, $ROCO_2Li$, HCOLi, ROLi, $(ROCO_2Li)_2$, $Li_2S$, $Li_xSO_y$, or a combination thereof, wherein X=F, Cl, I, or Br, R is a hydrocarbon group, and $0<x\leq1$, $1\leq y\leq4$.

2. The porous graphene particulate of claim 1, wherein multiple graphene sheets contain single-layer or few-layer graphene, wherein said few-layer graphene sheets have 2-10 layers of stacked graphene planes having an inter-plane spacing $d_{002}$ from 0.3354 nm to 0.6 nm as measured by X-ray diffraction and said single-layer or few-layer graphene sheets contain a pristine graphene material having essentially zero % of non-carbon elements, or a non-pristine graphene material having 0.001% to 25% by weight of non-carbon elements.

3. The porous graphene particulate of claim 2, wherein said non-pristine graphene is selected from graphene oxide, reduced graphene oxide, graphene fluoride, graphene chloride, graphene bromide, graphene iodide, hydrogenated graphene, doped graphene, chemically functionalized graphene, or a combination thereof.

4. The porous graphene particulate of claim 1, wherein said intrinsically conducting polymer is selected from polyaniline, polypyrrole, polythiophene, polyfuran, polyacetylene, a bi-cyclic polymer, a sulfonated derivative thereof, or a combination thereof.

5. The porous graphene particulate of claim 1, wherein said pores further contain an electron-conducting material selected from a graphene sheet, expanded graphite flake, carbon nanotube, carbon nanofiber, carbon fiber, carbon particle, graphite particle, carbon black, acetylene black, pitch, an electron-conducting polymer, or a combination thereof.

6. The porous graphene particulate of claim 5, wherein said electron-conducting polymer is selected from polyaniline, polypyrrole, polythiophene, polyfuran, polyacetylene, a bi-cyclic polymer, a sulfonated derivative thereof, or a combination thereof.

7. The porous graphene particulate of claim 1, further containing lithium metal or sodium metal residing in at least a pore of said particulate and in physical contact with said lithium-attracting metal or sodium-attracting metal to form a lithium-preloaded or sodium-preloaded graphene particulate.

8. The porous graphene particulate of claim 1, wherein said particulate, when measured without said metal, has a density from 0.005 to 1.7 g/cm$^3$ and a specific surface area from 50 to 2,630 m$^2$/g.

9. The porous graphene particulate of claim 1, wherein said particulate, when measured without said metal, has a density from 0.1 to 1.7 g/cm$^3$, an average pore size from 2 nm to 50 μm.

10. The porous graphene particulate of claim 1, wherein said graphene shell comprises a non-pristine graphene material having a content of non-carbon elements in the range from 0.01% to 20% by weight and said non-carbon elements include an element selected from oxygen, fluorine, chlorine, bromine, iodine, nitrogen, hydrogen, or boron.

11. The porous graphene particulate of claim 1, wherein said porous particulate, when measured without said metal, has a physical density higher than 0.8 g/cm$^3$ and a specific surface area greater than 800 m$^2$/g.

12. The porous graphene particulate of claim 1, wherein said porous particulate, when measured without said metal, has a physical density higher than 1.0 g/cm$^3$ and a specific surface area greater than 500 m$^2$/g.

13. An alkali metal battery anode containing one or a plurality of particulates of claim 1 as an anode active material.

14. An alkali metal battery comprising a cathode, the anode of claim 13, a lithium source or a sodium source in ionic contact with said anode, and an electrolyte in ionic contact with both said cathode and said anode.

15. The alkali metal battery of claim 14, wherein said lithium source is selected from foil, particles, or filaments of lithium metal or lithium alloy having no less than 80% by weight of lithium element in said lithium alloy; or wherein said sodium source is selected from foil, particles, or filaments of sodium metal or sodium alloy having no less than 80% by weight of sodium element in said sodium alloy.

16. An alkali metal battery anode containing one or a plurality of said lithium-preloaded or sodium-preloaded graphene/carbon particulates of claim 7 as an anode active material.

17. An alkali metal battery comprising a cathode, the anode of claim 16, and an electrolyte in ionic contact with both said cathode and said anode.

18. The alkali metal battery of claim 14, which is a lithium metal battery, lithium-sulfur battery, lithium-selenium battery, lithium-air battery, sodium metal battery, sodium-sulfur battery, sodium-selenium battery, or sodium-air battery.

19. The alkali metal battery of claim 17, which is a lithium metal battery, lithium-sulfur battery, lithium-selenium battery, lithium-air battery, sodium metal battery, sodium-sulfur battery, sodium-selenium battery, or sodium-air battery.

20. A powder mass comprising one or a plurality of particulates of claim 1.

21. A powder mass comprising one or a plurality of said lithium-preloaded or sodium-preloaded graphene/carbon particulates of claim 7.

22. A lithium-ion battery comprising an anode, a cathode, an electrolyte in ionic contact with said anode and said cathode, wherein said anode comprises a first anode active material, comprising one or a plurality of said lithium-preloaded graphene particulates of claim 7, and a second anode active material, wherein said lithium-preloaded graphene particulates act as a lithium source for said second anode active material when an electrolyte is introduced into said anode or during a charge/discharge cycle of said lithium-ion battery.

23. The lithium-ion battery of claim 22, wherein said second anode active material is selected from the group consisting of:
(A) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd);
(B) alloys or intermetallic compounds of Si, Ge, Sn, Pb, Sb, Bi, Zn, Al, Ti, Ni, Co, or Cd with other elements;
(C) oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites;
(D) salts and hydroxides of Sn;
(E) lithium titanate, lithium manganate, lithium aluminate, lithium-containing titanium oxide, lithium transition metal oxide;
(F) graphite or carbon particles, filaments, fibers, nanofibers, nanotubes, or nanowires;
and combinations thereof.

24. A sodium-ion battery comprising an anode, a cathode, an electrolyte in ionic contact with said anode and said cathode, wherein said anode comprises a first anode active material, comprising one or a plurality of said sodium-preloaded graphene particulates of claim 7, and a second anode active material, wherein said sodium-preloaded graphene particulates act as a sodium source for said second anode active material when an electrolyte is introduced into said anode or during a charge/discharge cycle of said sodium-ion battery.

25. The sodium-ion battery of claim 24, wherein said second anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (d) graphite or carbon particles, filaments, fibers, nanofibers, nanotubes, or nanowires; and (e) combinations thereof.

26. A method of prelithiating or pre-sodiating a lithium-ion battery or sodium-ion battery, said method comprising an operation of combining lithium-preloaded or sodium-preloaded graphene particulates as a first anode active material and a second anode active material in an anode of a lithium-ion battery or sodium-ion battery and introducing an electrolyte into said anode;

wherein said graphene particulates include an electron-conducting or lithium ion-conducting material;

wherein said electron-conducting material is selected from an intrinsically conducting polymer, a pitch, a metal, a combination thereof, or a combination thereof with carbon, wherein said metal does not include Au, Ag, Mg, Zn, Ti, Li, Na, K, Al, Fe, Mn, Co, Ni, Sn, V, Cr, or an alloy thereof; and wherein said lithium ion-conducting material is selected from $Li_2CO_3$, $Li_2O$, $Li_2C_2O_4$, LiOH, LiX, $ROCO_2Li$, HCOLi, ROLi, $(ROCO_2Li)_2$, $Li_2S$, $Li_xSO_y$, or a combination thereof, wherein X=F, Cl, I, or Br, R is a hydrocarbon group, and $0<x\leq1$, $1\leq y\leq4$.

* * * * *